United States Patent
Kim

(10) Patent No.: US 11,809,134 B2
(45) Date of Patent: Nov. 7, 2023

(54) METHOD AND APPARATUS OF AUTOMATIC OPTICAL INSPECTION USING SCANNING HOLOGRAPHY

(71) Applicant: CUBIXEL CO., LTD., Seoul (KR)

(72) Inventor: Tae Geun Kim, Seoul (KR)

(73) Assignee: CUBIXEL CO., LTD., Seoul (KR)

( * ) Notice: Subject to any disclaimer, the term of this patent is extended or adjusted under 35 U.S.C. 154(b) by 153 days.

(21) Appl. No.: 17/608,288

(22) PCT Filed: Jun. 3, 2020

(86) PCT No.: PCT/KR2020/007189
§ 371 (c)(1),
(2) Date: Nov. 2, 2021

(87) PCT Pub. No.: WO2020/246788
PCT Pub. Date: Dec. 10, 2020

(65) Prior Publication Data
US 2022/0221822 A1 Jul. 14, 2022

(30) Foreign Application Priority Data

Jun. 5, 2019 (KR) .................. 10-2019-0066639
Jun. 5, 2019 (KR) .................. 10-2019-0066643

(51) Int. Cl.
*G06T 7/55* (2017.01)
*G03H 1/22* (2006.01)
(Continued)

(52) U.S. Cl.
CPC .......... *G03H 1/2294* (2013.01); *G01B 9/021* (2013.01); *G03H 1/0005* (2013.01);
(Continued)

(58) Field of Classification Search
CPC ............... G03H 1/2294; G03H 1/0005; G03H 2001/0033; G03H 2226/02; G06T 7/55;
(Continued)

(56) References Cited

U.S. PATENT DOCUMENTS 11,680,655 B1 * 6/2023 Fatehi .................. F16K 17/363
 700/282
2017/0221230 A1 * 8/2017 Allinson ............... G06T 7/0012
(Continued)

FOREIGN PATENT DOCUMENTS

JP H07-318331 A 12/1995
KR 10-2013-0081127 A 7/2013
(Continued)

OTHER PUBLICATIONS

International Search Report for PCT/KR2020/007189 dated Sep. 3, 2020 from Korean Intellectual Property Office.

*Primary Examiner* — James T Boylan
(74) *Attorney, Agent, or Firm* — Paratus Law Group, PLLC

(57) ABSTRACT

Disclosed are a method and apparatus of automatic optical inspection using scanning holography. The apparatus for automatic optical inspection using scanning holography includes: a hologram capturer that takes a hologram of an object existing on an objective plate using a scanning hologram camera; a depth position/rotation angle extractor that extracts a depth position and a rotation angle about an objective surface of the objective plate on the basis of the hologram or the detected monitoring-light; a rotated coordinate system generator that generates a rotated coordinate system corresponding to the objective surface using the depth position and the rotation angle; and a hologram
(Continued)

restorer that obtains an image of the object by restoring the hologram in a plane formed in a depth direction of the rotated coordinate system.

20 Claims, 10 Drawing Sheets

(51) Int. Cl.
    *G01B 9/021*     (2006.01)
    *G03H 1/00*     (2006.01)
    *G06T 7/00*     (2017.01)
    *H04N 5/262*     (2006.01)
    *H04N 23/56*     (2023.01)

(52) U.S. Cl.
    CPC .............. *G06T 7/0004* (2013.01); *G06T 7/55* (2017.01); *H04N 5/2628* (2013.01); *H04N 23/56* (2023.01); *G03H 2001/0033* (2013.01); *G03H 2226/02* (2013.01); *G06T 2200/04* (2013.01); *G06T 2207/10012* (2013.01); *G06T 2207/20081* (2013.01); *G06T 2207/20084* (2013.01); *G06T 2207/30108* (2013.01)

(58) Field of Classification Search
    CPC .............. G06T 7/0004; G06T 2200/04; G06T 2207/10012; G06T 2207/20084; G06T 2207/20108; H04N 23/56; H04N 5/2628; G01B 9/021
    See application file for complete search history.

(56) References Cited

U.S. PATENT DOCUMENTS

2021/0312596 A1\* 10/2021 Hagiwara ................. G06T 3/20
2022/0043251 A1\* 2/2022 Moore ................... G02B 21/06
2022/0206629 A1\* 6/2022 Mochizuki .............. G06F 3/017

FOREIGN PATENT DOCUMENTS

| KR | 10-2014-0021765 A | 2/2014 |
|---|---|---|
| KR | 10-2014-0121107 A | 10/2014 |
| KR | 10-1529820 B1 | 6/2015 |

\* cited by examiner

100

METHOD AND APPARATUS OF AUTOMATIC OPTICAL INSPECTION USING SCANNING HOLOGRAPHY

ACKNOWLEDGEMENT

The present patent application has been filed as a research project as described below.
  National Research & Development Project for Supporting Invention
  Project Number: 1711081181
  Name of Department: Ministry of Science and ICT
  Specialized Institution for Research Management: Institution for Information & Communication Technology Promotion
  Research Name: Digital Contents Technology Development (R&D)
  Subject Name: Open Library Technology Development for Production & Simulation of Digital Hologram Contents
  Contribution Ratio: 1/1
  Main Agency: KETI
  Research Period: 2019 Jan. 1~2019 Dec. 31

CROSS-REFERENCE TO PRIOR APPLICATIONS

This application is a National Stage Patent Application of PCT International Patent Application No. PCT/KR2020/007189 (filed on Jun. 3, 2020) under 35 U.S.C. § 371, which claims priority to Korean Patent Application Nos. 10-2019-0066639 (filed on Jun. 5, 2019) and 10-2019-0066643 (filed on Jun. 5, 2019), which are all hereby incorporated by reference in their entirety.

BACKGROUND

The present disclosure relates to an apparatus and method of automatic optical inspection and, more particularly, a scanning hologram camera apparatus and a method that can obtain image information to which high-precision automatic optical inspection can be applied regardless of rotation and defocus by taking a hologram of an imaging object and numerically processing the hologram.

An apparatus and method of automatic optical inspection based on an optical microscope extracts focused image information of an object on an objective plate using an optical microscope into a digital signal type and numerically recognizes the digital signal using a computer, thereby inspecting the object for defects or distortion. However, in order to obtain an image of an object with high resolution using such an automatic optical inspection apparatus and method, the depth of focus of the objective lens is decreased to the level of several micrometers, so it is required to precisely align the objective plate, precisely mechanically adjust the focus of the objective lens, etc.

Further, in order to obtain a 3D image of an object, an objective plate is sequentially positioned in the depth direction, focused images are obtained at the sequential depth positions, and then the images are combined, thereby obtaining a 3D image of the object. Alternatively, an objective lens is sequentially positioned in the depth direction, focused images are sequentially obtained in the depth direction, and then the images are combined, thereby obtaining a 3D image of the object.

Therefore, according to the automatic inspection apparatus based on the existing optical imaging system according to mechanical alignment and focus adjustment, not only there is a need for an additional device for precise mechanical control, but it is difficult to perform ultrahigh-speed inspection through mechanical motions. In an example of inspecting an object on a conveyer belt, the object on the conveyer belt goes out of the region of the depth of focus of an objective lens due to shaking of the conveyer belt and is inclined by rotation at a defocused depth position.

In order to realign the object inclined in the defocused region into the region of the depth of focus of the objective lens, it is required to realign the object not only by precisely detecting the defocused depth position and the rotation angle of the inclination, but by performing precise mechanical control using the detected depth position and the rotation angle of the inclination. Actually, it is difficult to add a mechanical device, which rotates or moves an object positioned on a conveyer belt in a depth direction on the conveyer belt, in terms of structure on the conveyer belt, so a focused image is obtained by positioning an object onto an objective plate, which is precisely aligned, using a robot arm, etc. on a conveyer belt and then adjusting the focus through mechanical movement of an objective lens. Accordingly, a hologram camera and a numerical processing method that can obtain image information to which high-precision automatic optical inspection can be applied without precise mechanical realignment by obtaining a focused clear image regardless of rotation and defocus even at rotated and defocused positions of an objective plate by taking a hologram of an object without precise mechanical calibration and by numerically processing the hologram.

PRIOR ART DOCUMENT

Patent Document

Korean Patent No. 10-1304695 (2013.08.30)

SUMMARY

An embodiment of the present disclosure provides a method and apparatus of automatic optical inspection using scanning holography, the method and apparatus being able to obtain a depth position and a rotation angle of an objective plate by taking a single-shot hologram of an imaging object using a scanning hologram camera and by numerically processing the hologram.

An embodiment of the present disclosure provides a method and apparatus of automatic optical inspection using scanning holography, the method and apparatus being able to obtain a depth position and a rotation angle of an objective plate by taking a single-shot hologram of an imaging object using a scanning hologram camera and by using information obtained through monitoring-light.

An embodiment of the present disclosure provides a method and apparatus of automatic optical inspection using scanning holography, the method and apparatus being able to obtain image information, to which high-precision automatic optical inspection can be applied, regardless of precise mechanical calibration by obtaining a focused and clear image regardless of rotation and defocus at an inclined position of an objective plate.

In the embodiments, an apparatus for automatic optical inspection using scanning holography includes: a hologram capturer that takes a hologram of an object existing on an objective plate using a scanning hologram camera; a depth position/rotation angle extractor that extracts a depth position and a rotation angle about an objective surface of the objective plate on the basis of the hologram; a rotated coordinate system generator that generates a rotated coordinate system corresponding to the objective surface using the depth position and the rotation angle; and a hologram restorer that obtains an image of the object by restoring the hologram in a plane formed in a depth direction of the rotated coordinate system.

The apparatus may further include a light-monitoring processor that radiates monitoring-light toward a surface of any one of the objective plate and the object and detects monitoring-light reflected by the surface, in which the depth position/rotation angle extractor may extract a depth position and a rotation angle about the objective surface of the objective plate on the basis of the detected monitoring-light.

The scanning hologram camera may include a light source that generates an electromagnetic wave, a splitting unit that splits the electromagnetic wave, a scan unit that scans the object using interference beams generated by the split electromagnetic waves, and a light detection unit that detects a reflected, fluorescent, or transmitted beam from the object; and the hologram capturer may generate a complex-number hologram as the result of taking a hologram.

The light-monitoring processor may include: a monitoring-light generation module that is disposed on the objective plate and generates monitoring-light that is radiated to the object; and a light position detection unit that detects the monitoring-light that is reflected by a surface of the object.

The light-monitoring processor may further include an optical element including an objective lens and a beam splitter on a travel path of the monitoring-light, and positions of the monitoring-light generation module and the light position detection module may be determined in accordance with operations therebetween and disposition of the optical element.

The monitoring-light generation module may generate at least two beams of light as monitoring-light and the light position detection module may be composed of an array of image elements including CCD and CMOS.

The depth position/rotation angle extractor may calculate the position of monitoring-light, which is reflected by a surface of the object or the objective plate, as a vector.

The depth position/rotation angle extractor may extract a depth position in each of three regions spaced apart from each other and independently defined on the objective surface, and then extracts a depth position and a rotation angle about the objective surface.

The depth position/rotation angle extractor may perform: a first step of restoring the hologram at each of sequential depth positions; a second step of calculating a focus metric in each of the three regions for restored images; and a third step of determining a depth position at which the focus metric is a maximum value as a depth position of each of the three regions.

The depth position/rotation angle extractor may obtain a depth position in each of the three regions as output by inputting hologram data into a Convolutional Neural Network (CNN) model and then may extract a depth position and a rotation angle of the objective surface.

The depth position/rotation angle extractor may input any one of a complex-number hologram obtained by the taking of a hologram, a real-number hologram corresponding to a real number part of the complex-number hologram, an imaginary-number hologram corresponding to an imaginary number part of the complex-number hologram, and an off-axis hologram combined using the complex-number hologram as the hologram data.

The depth position/rotation angle extractor may extract a depth position and a rotation angle about the objective surface using a CNN model generated through training in which a specific region for forming the hologram is input and a rotation angle of a rotated objective surface as output.

The depth position/rotation angle extractor may Fourier-transform the hologram into a spatial frequency region and then may use a region corresponding to the specific region in the spatial frequency region as input.

The depth position/rotation angle extractor may use at least one of a real number part, an imaginary number part, an amplitude part, and a phase part of a complex-number hologram about the specific region as the input.

The depth position/rotation angle extractor may extract a depth position and a rotation angle about the objective surface using gradient descent on the basis of a portion of or the entire region of the hologram.

The depth position/rotation angle extractor may guide a portion of or the entire region of the hologram for a rotation region in which the objective plate can be rotated and a depth region in which the objective plate can be positioned, and then may search out a rotation angle and a depth position at which a focus metric of the guided hologram has a maximum value.

The rotated coordinate system generator may generate a transform matrix that is generated using a depth position and a rotation angle extracted by the depth position/rotation angle extractor and transforms a reference coordinate system into a rotated coordinate system.

The hologram restorer may restore an image of the object by transforming the hologram into the rotated coordinate system and guiding the hologram in a depth direction of the rotated coordinate system.

The hologram restorer may obtain an image of the object by transforming the hologram through angular spectrum rotational transformation and guiding the hologram in a depth direction of a rotated coordinate system.

The hologram restorer may obtain a 3D image of the object by transforming the hologram into the rotated coordinate system and restoring the hologram in each of planes formed in a depth direction in the rotated coordinate system.

The hologram restorer may obtain an image of the object by restoring the hologram at a depth position of a reference coordinate system and then guiding the hologram to a plane formed in a depth direction of the rotated coordinate system.

The hologram restorer may obtain a 3D image of the object by restoring the hologram at a depth position of a reference coordinate system and then guiding the hologram to sequential planes formed in the depth direction of the rotated coordinate system.

The hologram restorer may restore the hologram in each of sequential planes formed in a depth direction of a reference coordinate system and then may interpolate the restored holograms to the rotated coordinate system.

The hologram restorer may obtain an image of the object by generating a 3D matrix using a depth position of each of the sequential planes as an axis for images restored in the sequential planes and interpolating the 3D matrix to axes of the rotated coordinate system.

In embodiments, a method of automatic optical inspection using scanning holography includes: taking a hologram of an object existing on an objective plate using a scanning hologram camera; extracting a depth position and a rotation angle about an objective surface of the objective plate on the basis of the hologram; generating a rotated coordinate system corresponding to the objective surface using the depth position and the rotation angle; and obtaining an image of the object by restoring the hologram in a plane formed in a depth direction of the rotated coordinate system.

The method of automatic optical inspection using scanning holography may further include radiating monitoring-light toward a surface of any one of the objective plate and the object and detecting monitoring-light reflected by the surface, in which the extracting of a depth position and a rotation angle may include extracting a depth position and a rotation angle about the objective surface of the objective plate on the basis of the detected monitoring-light.

The present disclosure can have the following effects. However, a specific embodiment is not intended to have to include all of the following effects or only the following effects, so the scope of a right of the present disclosure should not be construed as being limited by the embodiment.

A method and apparatus of automatic optical inspection using scanning holography according to an embodiment of the present disclosure can obtain a depth position and a rotation angle of an objective plate by taking a single-shot hologram of an imaging object using a scanning hologram camera and by numerically processing the hologram.

The method and apparatus of automatic optical inspection using scanning holography according to an embodiment of the present disclosure can obtain a depth position and a rotation angle of an objective plate by taking a single-shot hologram of an imaging object using a scanning hologram camera and by using information obtained through monitoring-light.

The method and apparatus of automatic optical inspection using scanning holography according to an embodiment of the present disclosure can obtain image information, to which high-precision automatic optical inspection can be applied, regardless of precise mechanical calibration by obtaining a focused and clear image regardless of rotation and defocus at an inclined position of an objective plate.

DETAILED DESCRIPTION

Figure 1:
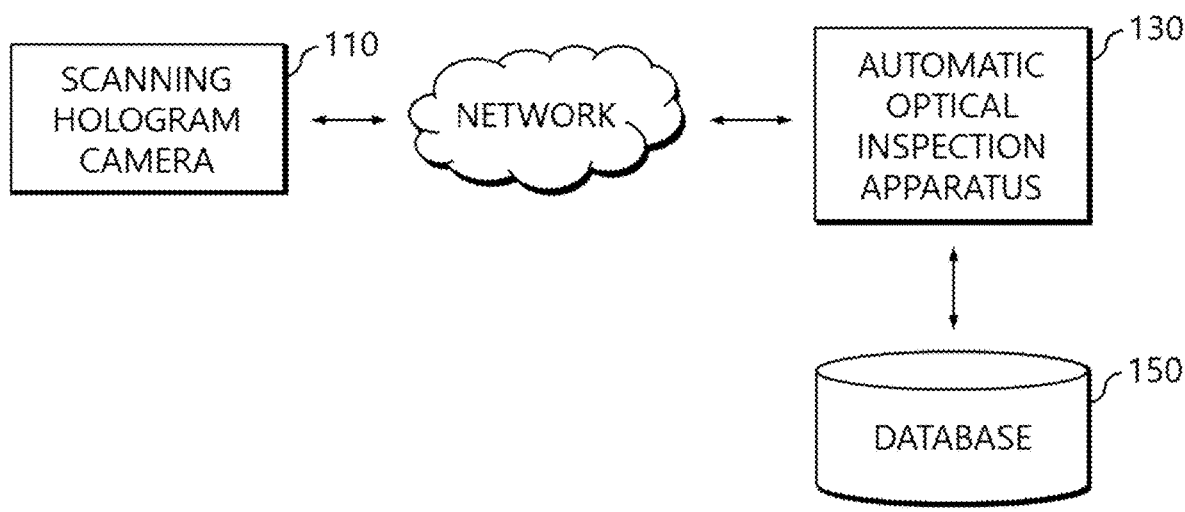
FIG. 1 is a diagram illustrating the configuration of a system for automatic optical inspection using scanning holography according to the present disclosure.

The description of the present disclosure is merely an example for structural or functional explanation, and therefore, the scope of the present disclosure should not be construed as being limited by the embodiments described in the text. That is, since the embodiments can be variously embodied and have various forms, the scope of the present disclosure should be understood to include equivalents capable of realizing technical ideas. Also, since the purpose or effect set forth in the present disclosure is not intended imply that to the specific embodiment, the scope of the present disclosure should not be construed as being limited thereto.

Meanwhile, the meaning of the terms described in the present application should be understood as follows.

The terms such as "the first", "the second", and the like, are intended to distinguish one element from another, and the scope of the right should not be limited by these terms. For example, the first component may be referred to as the second component, and similarly, the second component may also be referred to as the first component.

It is to be understood that when an element is referred to as being "connected" to another element, it may be directly connected to the other element, but there may also be other elements in between. On the other hand, when an element is referred to as being "directly connected" to another element, it should be understood that there is no other element in between. On the other hand, other expressions that describe the relationship between elements, that is, "between~" and "just between~" or "adjacent to~" and "directly adjacent to~" should be interpreted likewise as well.

The singular expressions should be understood to include plural expressions unless the context clearly dictates otherwise. It is also to be understood that the terms "comprise", "include", "have", and the like, are to designate the presence of practiced features, numbers, steps, operations, elements, parts, or combinations thereof, but do not preclude the presence or addition, possibility of one or more other features, numbers, steps, operations, elements, parts, or combinations thereof.

In each step, the identification code (e.g., a, b, c, etc.) is used for convenience of explanation, but the identification code does not describe the order of each step, and unless otherwise explicitly stated, it may occur differently from the stated order. That is, each of steps may occur in the same order as described, may also be performed substantially at the same time, and may be performed in reverse order.

The present disclosure can be embodied as a computer-readable code on a computer-readable recording medium, and the computer-readable recording medium includes all kinds of recording devices for storing data, which can be read by a computer system. Examples of the computer-readable recording medium include ROM, RAM, CD-ROM, magnetic tape, floppy disk, optical data storage device, and the like. In addition, the computer-readable recording medium may be distributed over network-connected computer systems so that computer readable codes can be stored and executed in a distributed manner.

All terms used herein have the same meaning as commonly understood by one of ordinary skill in the art to which this disclosure belongs, unless otherwise defined. Terms defined in commonly used dictionaries should be interpreted to be consistent with meaning in the context of the related art and cannot be interpreted as having ideal or overly formal meaning unless explicitly defined in the present application.

FIG. 1 is a diagram illustrating the configuration of a system for automatic optical inspection using scanning holography according to the present disclosure.

Referring to FIG. 1, a system 100 for automatic optical inspection using scanning holography may include a scanning hologram camera 110, an automatic optical inspection apparatus 130, and a database 150.

The scanning hologram camera 110 may be an apparatus that can take a hologram of an inspection object positioned on an objective plate. The scanning hologram camera 110 may be connected with the automatic optical inspection apparatus 130 through a network and a plurality of scanning hologram cameras 110 may be all connected with the automatic optical inspection apparatus 130.

In an embodiment, the scanning hologram camera 110 may be included as a component of the automatic optical inspection apparatus 130, and in this case, the scanning hologram camera 110 may be an independent module that performs an operation of taking a hologram of an object.

In an embodiment, the scanning hologram camera 110 may include a light source that generates an electromagnetic wave, a splitting unit that splits the electromagnetic wave, a scan unit that scans an object using interference beams that are produced by the split electromagnetic waves, and a light detection unit that detects beams reflected, fluorescent, or transmitted beams from the object.

The light source may include various means such as a laser generator that can generate an electromagnetic wave, a Light Emitting Diode (LED), and a beam having low coherence such as halogen light having a small coherence length.

The splitting unit can split the electromagnetic wave, for example, a laser beam generated by the light source into a first beam and a second beam. In an embodiment, the splitting unit may include an optical fiber coupler, a beam splitter, and a geometric phase lens, can be implemented in a type of transmitting a beam by guiding a free space, and can also split a beam into a first beam and a second beam on an in-line using a unit that can split a beam on an in-line such as a geometric phase lens.

The scan unit can scan an imaging object using interference beams (or an interference pattern) formed by split electromagnetic waves. The scan unit may be a mirror scanner, but is not necessarily limited thereto and may be replaced with well-known various scan units. For example, the scan unit can scan an imaging object by moving a Fresnel zone plate across the imaging object. In this case, the scan unit can adjust the scanning position in response to a control signal. Further, the scan unit can scan an imaging object by positioning the imaging object on an objective plate and horizontally moving the objective plate.

The light detection unit can detect and convert a beam into a current signal. In this case, the light detection unit can generate a current in accordance with the intense of the detected beam. The light detection unit may be implemented using an optical diode, but is not necessarily limited thereto and may include various light detection units such as a photo-multiplier tube. Further, the light detection unit may include a condenser that condenses reflected, fluorescent, or transmitted beams from an imaging object.

The automatic optical inspection apparatus 130 may be implemented as a server corresponding to a computer or a program that can obtain clear image regardless of defocus and rotation by taking a hologram of an inspection object and numerically processing the hologram. The automatic optical inspection apparatus 130 can be wirelessly connected with an external system (not shown in FIG. 1), which performs independent operations, through Bluetooth, WiFi, a network, and can transmit/receive data to/from the external system through the network.

In an embodiment, the automatic optical inspection apparatus 130 can keep information that is needed in an automatic optical inspection process in cooperation with the database 150. Meanwhile, the automatic optical inspection apparatus 130, unlike FIG. 1, may include the database 150 therein. Further, the automatic optical inspection apparatus 130 may include a processor, a memory, a user I/O device, and a network I/O device as physical components.

The database 150 may be a storage device that keeps various items of information that are required in a process of performing automatic optical inspection using scanning holography. The database 150 can keep information about a hologram of an inspection object obtained from the scanning hologram camera 110, but is not necessarily limited thereto, and can keep information collected and processed in various types in a process of obtaining a clear image of an inspection object regardless of defocus and rotation by numerically processing the hologram obtained by the automatic optical inspection apparatus 130.

Figure 2:
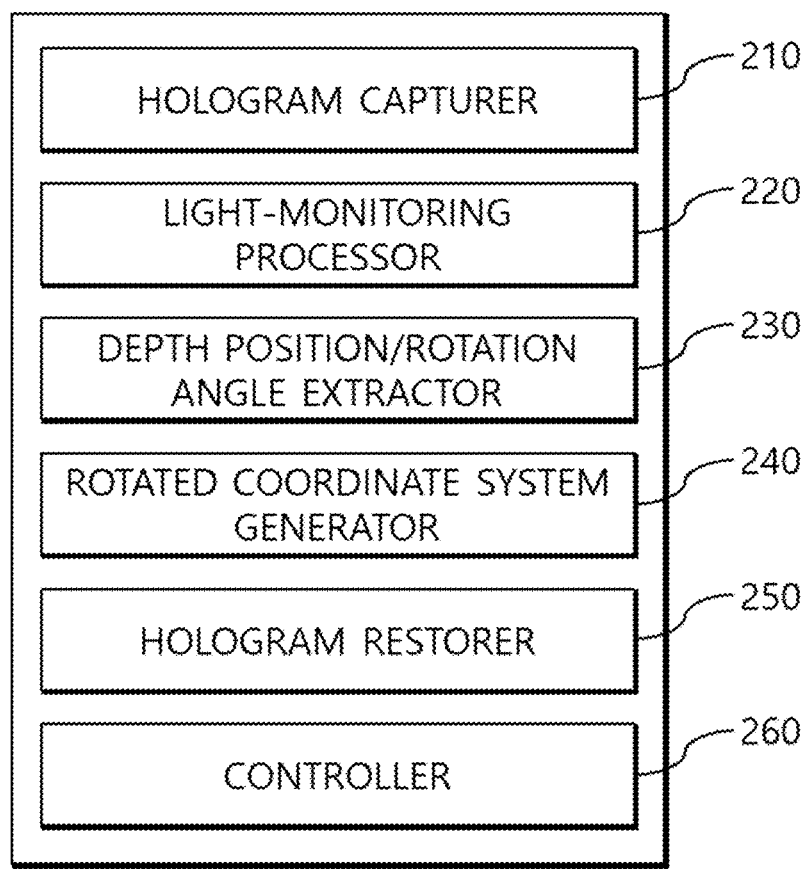
FIG. 2 is a block diagram illustrating the functional configuration of the automatic optical inspection apparatus shown in FIG. 1.

FIG. 2 is a block diagram illustrating the functional configuration of the automatic optical inspection apparatus shown in FIG. 1.

Referring to FIG. 2, the automatic optical inspection apparatus 130 may include a hologram capturer 210, a light-monitoring processor 220, a depth position/rotation angle extractor 230, a rotated coordinate system generator 240, a hologram restorer 250, and a controller 260.

The hologram capturer 210 can take a hologram of an object existing on an objective plate using the scanning hologram camera 110. In an embodiment, the hologram capturer 210 can generate a complex-number hologram as the result of imaging.

Figure 5:
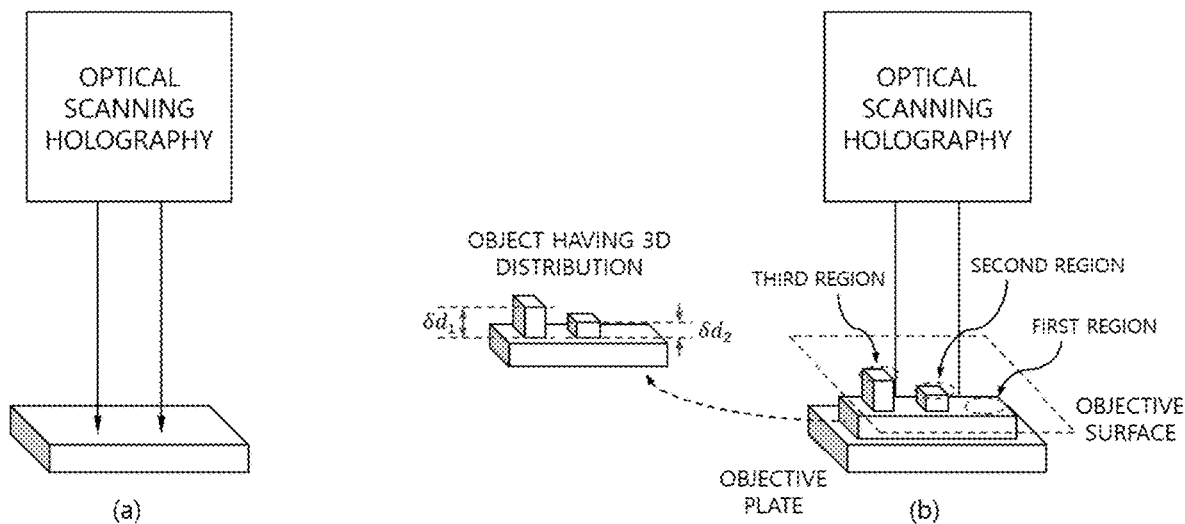
FIG. 5 is a diagram illustrating imaging an inspection object using optical scanning hologram.

In an embodiment, the hologram capturer 210 can take a hologram of an object using an optical scanning hologram-based imaging technique. In more detail, the hologram capturer 210 can take a hologram of an object using an optical scanning hologram camera through the configuration shown in (a) of FIG. 5. Although reflected or fluorescent beams from an object are detected in (a) of FIG. 5, it is also possible to detect beams transmitted through an object by positioning a light detector under an objective surface. It is preferable that the objective is made of transparent glass or is bored at a portion corresponding to an object. In this case, the taken hologram can be expressed as the following equations 1 to 5.

$$i_H^1(x, y) = \int O(x_0, y_0; z) \otimes \exp\left[j\frac{\pi}{\lambda z}(x_0^2 + y_0^2)\right] dz \quad \text{[Equation 1]}$$

where $O(x_0, y_0; z)$ is a 3D image of an object as 3D distribution of reflectance of the object and $\otimes$ is convolution. Further, $(x, y)$ is the scan position of a scan beam designated by a scan unit and z, which is a depth position of the object, is the distance from the focus of a spherical wave to the object.

$$i_H^2(x, y) = \int O(x_0, y_0; z) \otimes \exp\left[j\frac{\pi d}{\lambda(d+z)z}(x_0^2 + y_0^2)\right] dz \quad \text{[Equation 2]}$$

where d is the distance between the focus of a first spherical wave and the focus of a second spherical wave. It is possible to correct distortion of a hologram due to zoom-out and zoom-in by adjusting d. As a method of adjusting d, it is possible to adjust d by changing the position and the focal distance of a lens in accordance with an imaging law of a lens.

$$\vec{i}_H^3(x, y) = \int O(x_0, y_0; z) \otimes \exp\left[j\frac{\pi d}{\lambda\left(z^2 - \frac{d^2}{4}\right)}(x_0^2 + y_0^2)\right]dz \quad \text{[Equation 3]}$$

$$\vec{i}_H^4(x, y) = \int O(x_0, y_0; z) \otimes \exp\left[j\frac{2\pi f_{gp}}{\lambda(2f_{gp} + z)z}(x_0^2 + y_0^2)\right]dz \quad \text{[Equation 4]}$$

$$\vec{i}_H^5(x, y) = \int O(x_0, y_0; z) \otimes$$
$$\exp\left[j\frac{2\pi M_{img}^2 f_{gp}}{\lambda(2M_{img}^2 f_{gp} + z_{img})z_{img}}(M_{img}^2 x_0^2 + M_{img}^2 y_0^2)\right]dz \quad \text{[Equation 5]}$$

where $M_{img}$ is zoom-out of zoom-in of an image by a first lens when imaging the pattern of a polarization-sensitive lens (geometric phase lens) to a surface of an object region, $z_{img}$ is the distance from the focus position of a second spherical wave to an object, and $2M_{img}^2 f_{gp}$ is the distance between the focuses of adjusted first and second spherical waves.

The light-monitoring processor 220 can radiate monitoring-light toward the surface of any one of an objective plate and an object and can detect monitoring-light reflected by the surface. For example, the light-monitoring processor 220 can extract a depth position and a rotation angle of an objective plate by positioning a reflective plate on an objective plate and detecting the position of light reflected when a laser is radiated to the reflective plate, using an image element, etc.

Figure 10:
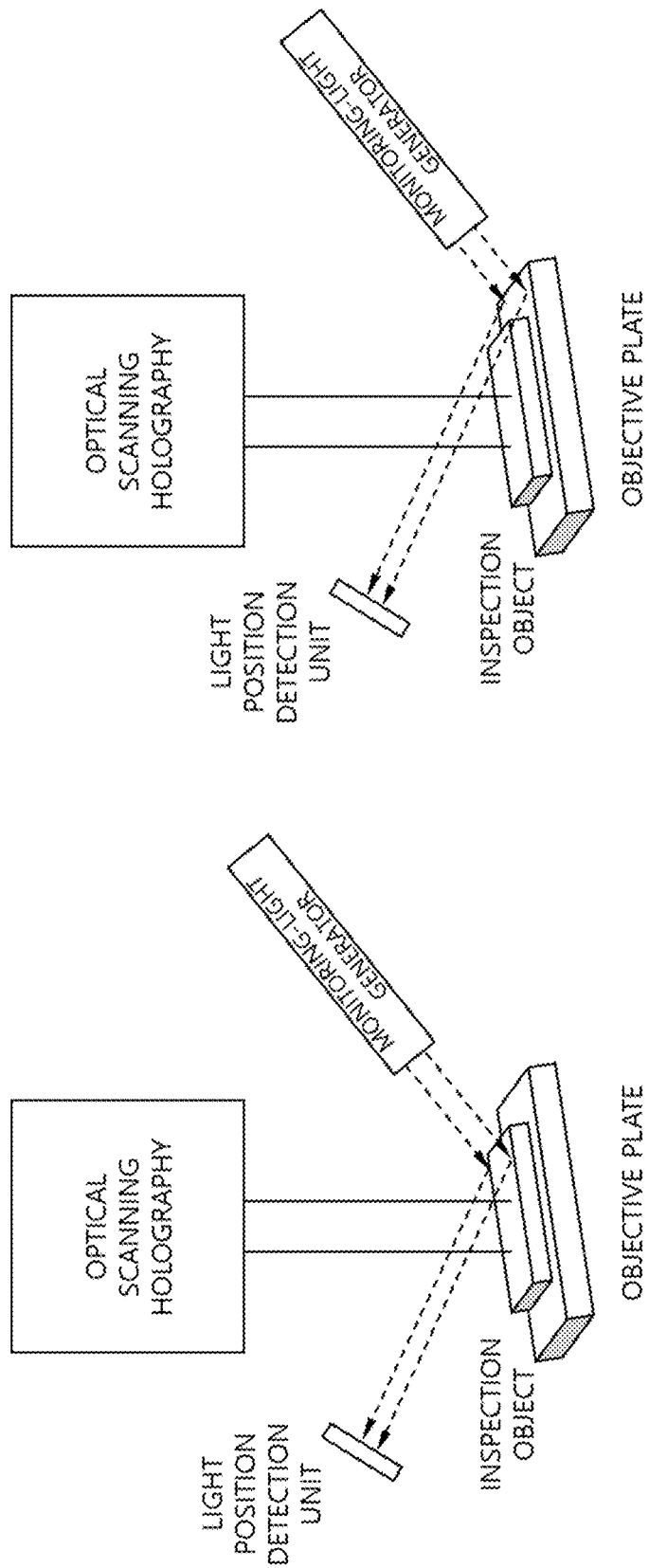
FIG. 10 is a diagram illustrating a monitoring-light generation and detection apparatus for measuring a depth and a rotation angle.

In an embodiment, the light-monitoring processor 220 may include a monitoring-light generation module disposed on an objective plate and generating monitoring-light that is radiated to an object, and a light position detection module detecting monitoring-light reflected by the surface of an object. Referring to FIG. 10, monitoring-light is radiated to an inspection object or an objective plate, and the monitoring-light is reflected by a surface of the inspection object and travels to a light position detection unit. The planar rotation angle of the inspection object is extracted from the position of the beam reaching the light position detection unit.

Figure 11:
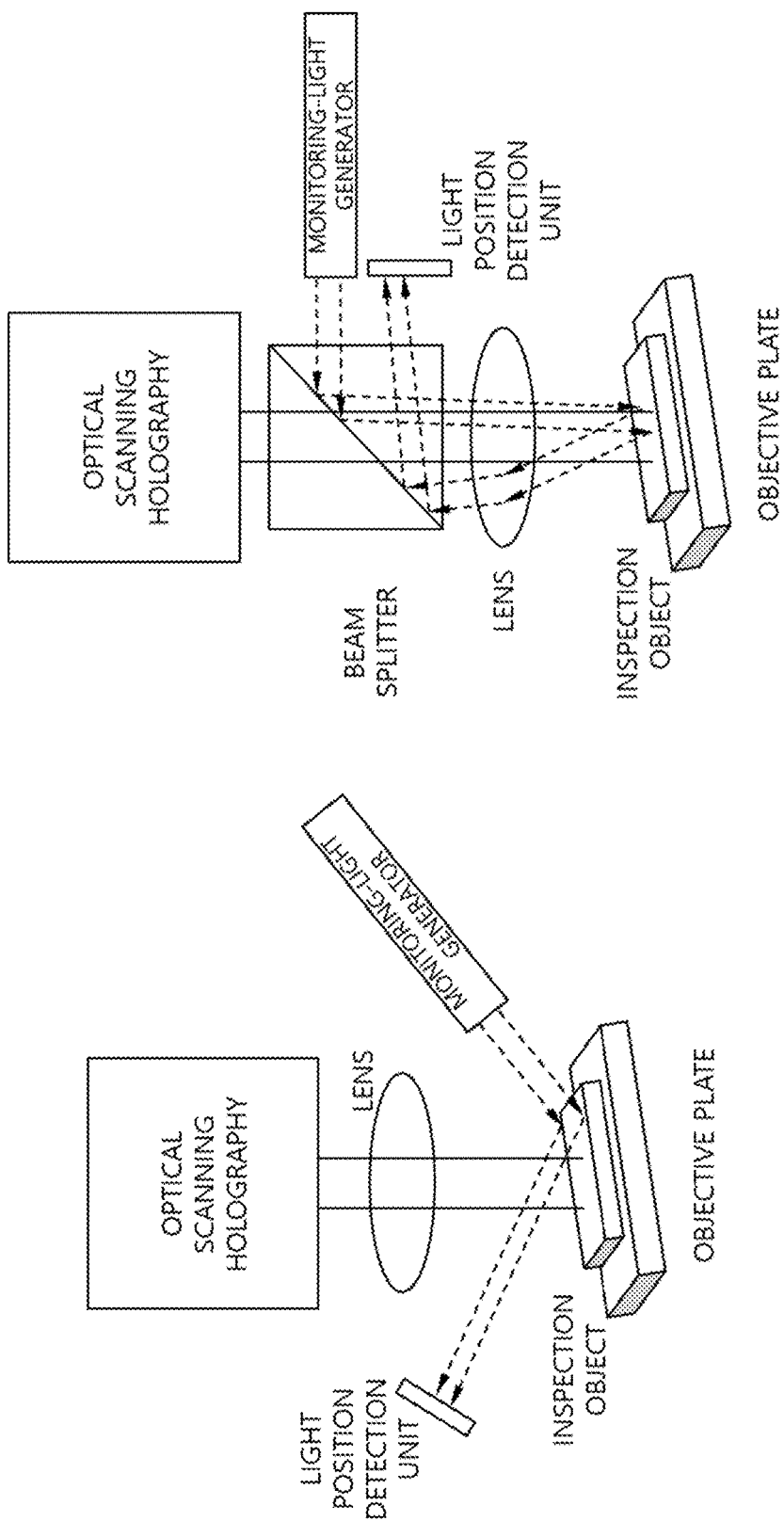
FIG. 11 is a diagram illustrating a monitoring-light generation and detection apparatus for measuring a depth and a rotation angle and an additional optical structure.

In an embodiment, the light-monitoring processor 220 further includes an optical element including an objective lens and a beam splitter on the travel path of monitoring-light, and the positions of the monitoring-light generation module and the light position detection module may be determined in accordance with operations therebetween and the disposition of the optical element. Referring to FIG. 11, the light-monitoring processor 220 may include a lens or a lens and a beam splitter between the monitoring-light generation module and the light position detection module.

Accordingly, the light-monitoring processor 220 can have various geometric structures and can perform position vector analysis in accordance with the geometric structures. Further, the light-monitoring processor 220 can perform geometric analysis on a position vector in consideration of a depth difference between an objective plate and an inspection object.

In an embodiment, the monitoring-light generation module can generate at least two rays of light as monitoring-light and the light position detection module may be composed of an array of image elements including CCD and CMOS. In FIG. 10, the monitoring-light generator (monitoring-light generation module) can generate and radiate two rays of light to an inspection object or an objective plate, and the two rays of light can be reflected by the inspection object or the objective plate and then can travel to the light position detection unit (light position detection module). In particular, the light position detection unit can provide the position of light traveling to an imaging element such as CCD as output.

The position of light reflected by an inspection object or an objective plate is given as the following equation 21 by a reflective vector.

$$\vec{r}^i = \vec{d}_i + 2(\vec{d}\cdot\hat{z}_{tilt})\hat{z}_{tilt}; i=\{1,2\} \quad \text{[Equation 21]}$$

where i={1,2} shows first and second monitoring beams parallel with each other, $\vec{d}_i$ is a projection direction vector of each of first and second rays of monitoring-light, and $\hat{z}_{tilt}$ is a normal vector of a rotated inspection object or objective surface. The light position detection module may be composed of an array of light detection elements in a flat plate shape such as an imaging element such as CCD and CMOS, and in this case, the position of monitoring-light detected on a light detection plane of a light detection unit is given as the following equation 22 in accordance with a cross-equation of a plane and a ray.

$$\vec{r}_{det\_plane}^i = \vec{r}_{obj\_plane}^i + \frac{\vec{r}_{obj\_plane}^i \circ \vec{n}_{det\_plane}}{\vec{d}_i \circ \vec{n}_{det\_plane}}\vec{r}^i; i = \{1, 2\} \quad \text{[Equation 22]}$$

where $\vec{n}_{det\_plane}$ is a normal vector of a detection plane of the light position detection module, and $\vec{r}_{obj\_plane}^i$ is a position vector indicating the position of monitoring-light reflected on an inspection object or an objective plate, that is, $\vec{r}_{obj\_plane}^i = l_d^i \vec{d}_i + \vec{r}_{mor\_st}^i$; i={1, 2}. In this case, $\vec{r}_{mor\_st}^i$; i={1, 2} is a position vector indicating the start position of first and second monitoring-light generated by the monitoring-light generation module, and $l_d^i$; i={1,2} is the distance to the inspection object or the objective plate in the projection direction of the first and second monitoring-light.

The depth position/rotation angle extractor 230 can extract a depth position and a rotation angle about the objective surface of an objective plate on the basis of a hologram. The objective surface may be a plane that is parallel with the objective plate. That is, the depth position/rotation angle extractor 230 can calculate a depth position and a rotation angle of an objective surface by numerically processing a hologram. In this case, the numerical method may include an extraction method base on 3-region analysis, an extraction method based on a CNN, and an extraction method based on gradient descent.

Figure 4:
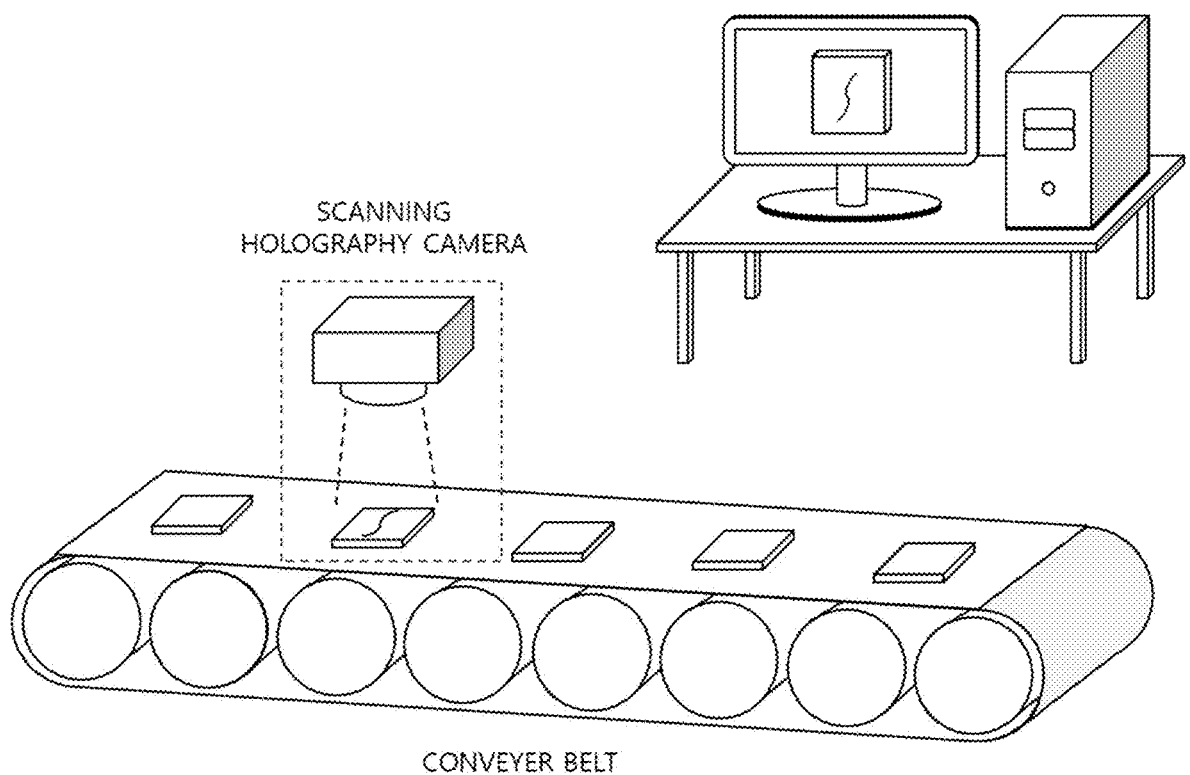
FIG. 4 is a diagram illustrating an embodiment of automatic optical inspection equipment using a scanning hologram camera.

In an embodiment, the depth position/rotation angle extractor 230 can extract a depth position at each of three regions spaced apart from each other and independently defined on an objective surface, and then can extract a depth position and a rotation angle about the objective surface. For example, when an object on a conveyer belt is not horizontally positioned on an objective surface in FIG. 4, the depth position/rotation angle extractor 230 can extract a depth position and a rotation angle using a focus metric, and the rotated coordinate system generator 240 can generate a rotated coordinate system on the basis of the depth position and the rotation angle.

Figure 6:
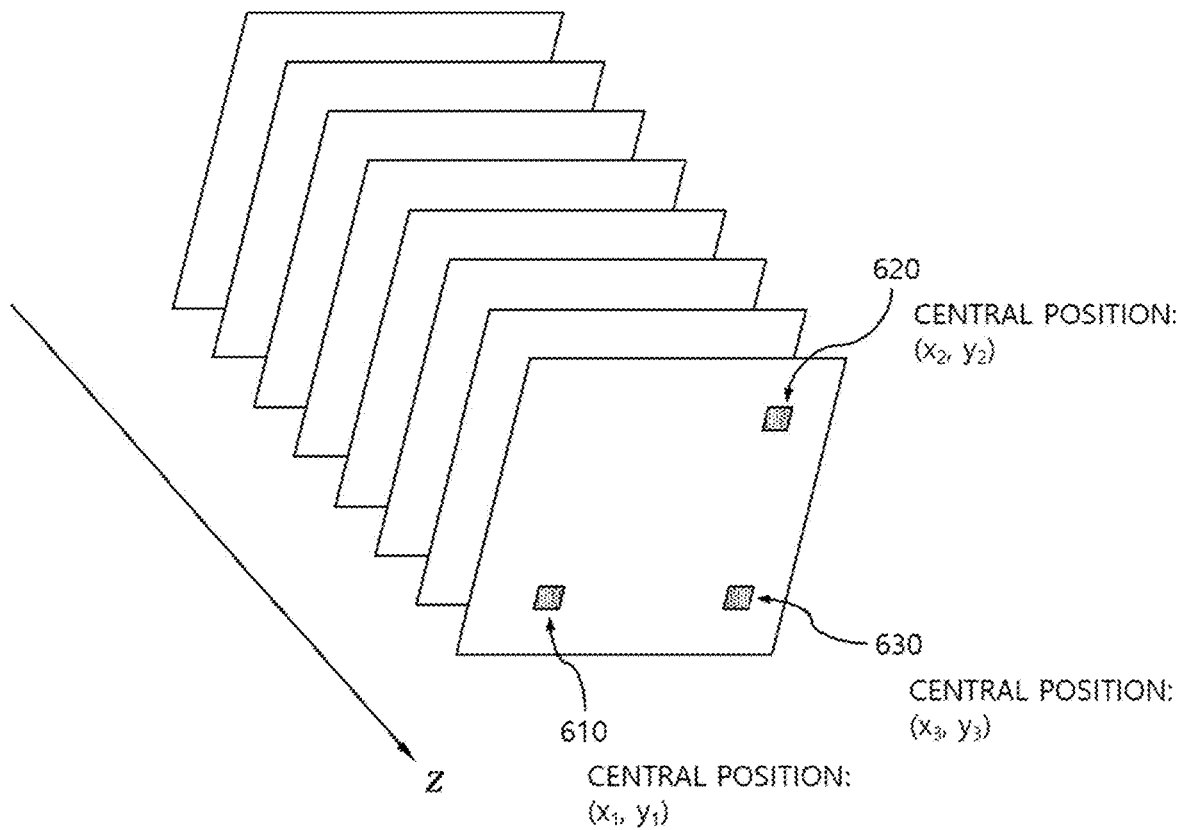
FIG. 6 is a diagram illustrating images restored images at sequential depth positions and depth position measurement regions.

The three regions may be the regions indicated by small rectangles in FIG. 6 and may be defined as first, second, and third cell regions 610, 620, and 630, respectively. The three regions may be spaced apart from each other and independently defined on a plane including the objective surface and may be specific regions including three different positions. Further, the three regions may be independently defined on a plane corresponding to the objective surface, depending on a depth position.

In an embodiment, the depth position/rotation angle extractor 230 may perform a first step of restoring holograms at sequential depth positions, respectively, a second step of calculating a focus metric at each of three regions for the restored images, and a third step of determining the depth position at which the focus metric is maximum as the depth position of each of the three regions. The depth position/rotation angle extractor 230 can restore the holograms of the equations 1 to 5 at sequential depth positions using digital back propagation. FIG. 6 shows holograms restored at sequential depth positions.

As a detailed example of a method of restoring a hologram at each of sequential depth positions, the holograms are restored by forming the holograms of the equations 1 to 5 and then convoluting conjugate complex numbers of a Fresnel zone plate of equation 51 to the holograms at corresponding sequential depth positions, respectively. This is given as the following equation 6. Further, holograms can be restored by convoluting each angular spectrum corresponding to the Fresnel zone plate of equation 51 at each depth position, can be restored by Rayleigh-Sommerfeld method, and can be restored through various well-known digital back propagations.

$$fzp_1(x_o, y_o; z) = \exp\left[j\frac{\pi}{\lambda z}(x_0^2 + y_0^2)\right] \quad \text{[Equation 51]}$$

$$fzp_2(x_o, y_o; z) = \exp\left[j\frac{\pi d}{\lambda(d+z)z}(x_0^2 + y_0^2)\right]$$

$$fzp_3(x_o, y_o; z) = \exp\left[j\frac{\pi d}{\lambda\left(z^2 - \frac{d^2}{4}\right)}(x_0^2 + y_0^2)\right]$$

$$fzp_4(x_o, y_o; z) = \exp\left[j\frac{2\pi f_{gp}}{\lambda(2f_{gp}+z)z}(x_0^2 + y_0^2)\right]$$

$$fzp_5(x_o, y_o; z) =$$
$$\exp\left[j\frac{2\pi M_{img}^2 f_{gp}}{\lambda(2M_{img}^2 f_{gp} + z_{img})z_{img}}(M_{img}^2 x_0^2 + M_{img}^2 y_0^2)\right]$$

$$O_{rec}(x, y; z) = i_H^l(x, y) \otimes fzp_1(x, y; z)^* \quad \text{[Equation 6]}$$

where l={1, 2, 3, 4, 5} indicate holograms obtained through the equations 1 to 5, respectively, and a Fresnel zone plate corresponding to equation 51. '*' is a conjugate complex number.

Further, the depth position/rotation angle extractor 230 can find out depth positions at three points (610, 620, and 630 in FIG. 6) of images restored at sequential depth positions. A detail method of finding out a depth position is to restore rotated holograms at sequential depth positions (FIG. 6) and then to calculate focused depth positions in first, second, and third cell regions of the images restored at the sequential depth positions. Various algorithms for calculating a focused depth position are well known in the computer vision field.

Further, the depth position/rotation angle extractor 230 can determine the depth positions at which the focus metrics of the first, second, and third regions are maximum as the depth positions of the first, second, and third regions. The depth position/rotation angle extractor 230 may use various focus metrics, and for example, may use a Tamura coefficient as a focus metric. The Tamura coefficient in n-th regions (n={1, 2, 3}) of an image restored at a depth position z is as the following equation 7.

$$C_n(z) = \sqrt{\frac{\sigma(x, y; z)|_{n_{th} region}}{\langle O_{rec}(x, y; z)\rangle|_{n_{th} region}}} \quad ; n = \{1, 2, 3\} \quad \text{[Equation 7]}$$

where $\sigma(x,y;z)|_{n_{th}\ region}$ is the standard deviation in n-th regions (n={1, 2, 3}) of an image restored at a depth position z, and $<O_{rec}(x,y;z)>|_{n_{th}\ region}$ is the average in the n-th regions (n={1, 2, 3}) of the image restored at a depth position z. Assuming that the depth positions in the first, second, and third regions where the Tamura coefficient according to equation 7 is maximum is $z_1$, $z_2$ and $z_3$, the coordinates of the central points of the first, second, and third regions are $(x_1, y_1, z_1)$, $(x_2, y_2, z_2)$, and $(x_3, y_3, z_3)$, respectively. Although a hologram including first, second, and third regions is restored to extract a depth position in the above description, it is also possible to find out a depth position through the above method by restoring a portion including a first cell region, a portion including a second cell region, and a portion including a third cell region.

Further, when relative depth position in first, second, and third regions are different, depending on the 3D distribution of an object, the depth position/rotation angle extractor 230 can extract a depth position about an objective surface by correcting depth positions extracted through the above method using information about the relative depth positions. Referring to (b) of FIG. 5, when an object has 3D distribution, according to the method described above, not a depth position of the objective surface, but a depth position in each corresponding region of the object can be extracted. The depth position/rotation angle extractor 230 can recognize 3D distribution of an object in advance and can extract a depth position of an objective surface of an objective plate by correcting an extracted depth position using information δd1 and δd2 about a relative depth position.

In an embodiment, the depth position/rotation angle extractor 230 can extract a depth position directly from a hologram without restoring images at sequential depth positions. The method used in this case may include a method of numerically analyzing the fringe of a hologram.

In more detail, the depth position/rotation angle extractor 230 can extract depth positions of first, second, and third regions by performing fringe analysis on a partial hologram including the first cell region, a partial hologram including the second cell region, and a partial hologram including the third cell region without restoring a hologram. In this case, since the variation of the fringe of a hologram is linearly proportioned to a focused depth position, the focused depth position is extracted by obtaining the variation of the fringe.

Figure 7:
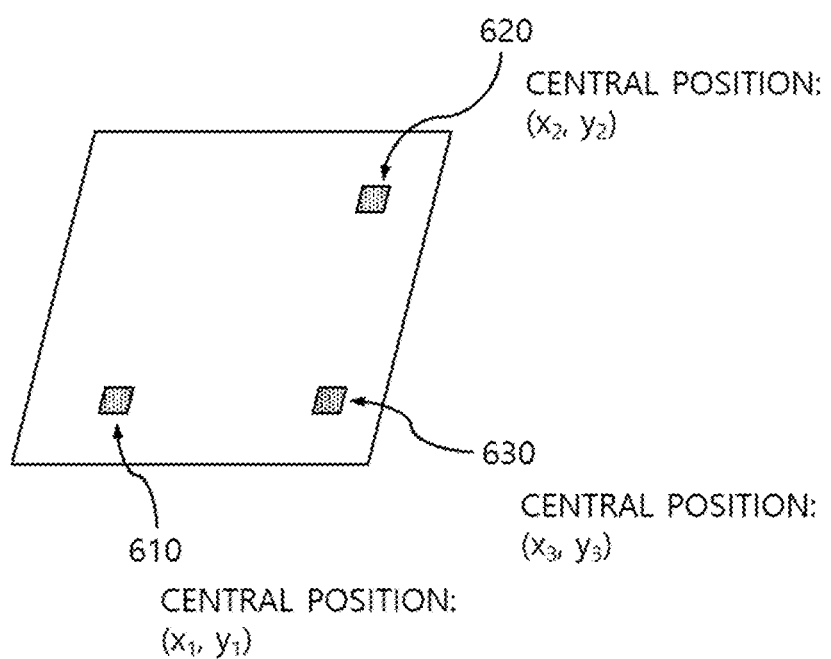
FIG. 7 is a diagram illustrating a hologram and depth position measurement regions.

That is, first, second, and third cell regions are extracted from the taken hologram of FIG. 7, the real number part and the imaginary number part of the holograms of the cell regions are extracted and Fourier-transformed, and then the Fourier-transformed real number part of each hologram is extracted and are added by a complex number addition method, whereby real number-only holograms are combined. This is given as the following equation 8.

$$H_{real-n}{}^l(k_x,k_y) = Re[F\{Re[i_{H-n}{}^l(x,y)]\}] + jRe[F\{Im[i_{H-n}{}^l(x,y)]\}]$$ [Equation 8]

where l={1,2,3,4,5} indicate the holograms obtained through equations 1 to 5, respectively, and n={1,2,3} indicate first, second, and third regions, respectively. F{ } is 2D Fourier transform, Re[ ] and Im[ ] are a real operator and an imaginary operator for extracting a rear number part and an imaginary number part from a complex number, respectively, and $(k_x,k_y)$ is a spatial frequency axis. A Fresnel zone plate in which the variation of a fringe increases in accordance with a depth position is obtained by applying power fringe-adjusted filtering to the real number-only hologram. This is given as the following equation 9.

$$H_{PFF}(k_\lambda) = \frac{1}{|\int H_{real-n}^l(k_x,k_y)dk_y|^2 + \delta} \times [H_{real-n}^l(k_x,k_y)dk_y]^2 \approx \exp\left(j\frac{\lambda f_l(z)}{2\pi}k_x^2\right)$$ [Equation 9]

where δ is a small value for preventing a pole problem in a power fringe-adjusted filter, l={1,2,3,4,5} indicate the holograms obtained through equations 1 to 5, and $f_l(z)$, which is a depth position-related parameter, is as the following equation 10 in accordance with the holograms obtained through equations 1 to 5.

$$\left\{f_1(z) = z, f_2(z) = \frac{(d+z)z}{d}, f_3(z) = \frac{\left(z^2 - \frac{d^2}{4}\right)}{d}, f_4(z) = \frac{(2f_{gp}+z)z}{2f_{gp}}, f_5(z) = \frac{(2M_{img}^2 f_{gp} + z_{img})z_{img}}{2\pi M_{img}^2 f_{gp}}\right\}$$ [Equation 10]

It is possible to obtain a straight line in a space and a spatial frequency region by obtaining wigner distribution of the Fresnel zone plate of equation 9. The slope of the straight line is the same as $f_l(z)$. Accordingly, $f_l(z)$ is obtained from the slope and then a focused depth position z is obtained in accordance with equation 10. Alternatively, the axis of the Fresnel zone plate of equation 9 is converted into a new axis through interpolation ($k_x^{new}=k_x^2$ for $k_x \geq 0$) and equation 9 is Fourier-transformed for the new axis, whereby a peak signal at the position of $f_l(z)$ on a frequency axis is generated. Accordingly, $f_l(z)$ is extracted at the peak position of the signal and then a focused depth position z is obtained in accordance with equation 10.

In an embodiment, the depth position/rotation angle extractor 230 can obtain depth positions in three regions as output by inputting hologram data into a Convolutional Neural Network (CNN) model, and then can extract a depth position and a rotation angle about an objective surface. In this case, the CNN model may be neural network trained in advance by a training unit, using hologram data about a training object obtained at various 3D positions known in advance for the training object, and corresponding position information as training data. In this case, position information is information including the depth position of the object. In this embodiment, a CNN is exemplified as an artificial neural network, but various types of neural networks may be used.

In an embodiment, the depth position/rotation angle extractor 230 can input any one of a complex-number hologram obtained through imaging, a real-number hologram corresponding to the rear number part of the complex-number hologram, an imaginary-number hologram corresponding to the imaginary part of the complex-number hologram, and an off-axis hologram combined using the complex-number hologram into the CNN model as hologram data.

In an embodiment, the depth position/rotation angle extractor 230 can extract a depth position and a rotation angle about an objective surface using a CNN model generated through training in which a specific region for forming a hologram is input and a rotation angle of a rotated objective surface as output. Referring to FIG. 9, the depth position/rotation angle extractor 230 can train a CNN by using a specific region 910 of a hologram as input and the rotation angles $\theta_x$, $\theta_y$, and $\theta_z$ of the rotated plane 830 of FIG. 8 as output.

In an embodiment, the depth position/rotation angle extractor 230 can Fourier-transform a hologram into a spatial frequency region and then can use a region corresponding to a specific region in the spatial frequency region as input. That is, the depth position/rotation angle extractor 230 can Fourier-transform a hologram into a spatial frequency region, and can train the CNN by extracting a partial region from the spatial frequency region and by using the partial region as input of the CNN and the rotation angle of the rotated plane 830 of FIG. 8 as output.

In an embodiment, the depth position/rotation angle extractor 230 can use at least one of the real number part, the imaginary number part, the amplitude part, and the phase part of a complex-number hologram related to a specific region for forming a hologram as input. That is, the depth position/rotation angle extractor 230 can train the CNN through a known CNN training method by using the real number part, the imaginary number part, the amplitude part, and the phase part of a hologram in a spatial frequency region or a combination of the parts as input of the CNN and the rotation angle of the rotated plane 830 of FIG. 8 as output on the basis of that a hologram in a spatial frequency region is composed of complex number.

In an embodiment, the depth position/rotation angle extractor 230 can extract a depth position and a rotation angle about an objective surface using gradient descent on the basis of a partial or the entire region of a hologram. That is, the depth position/rotation angle extractor 230 can search out a depth position and a rotation angle at which the focus metric in a portion of or the entire of a hologram is maximum through gradient descent.

In an embodiment, the depth position/rotation angle extractor 230 can guide a portion of or the entire region of a hologram for a rotation region in which the objective plate can be rotated and a depth region in which the objective plate can be positioned, and then can search out a rotation angle and a depth position at which the focus metric of the guided hologram has a maximum value.

Figure 8:
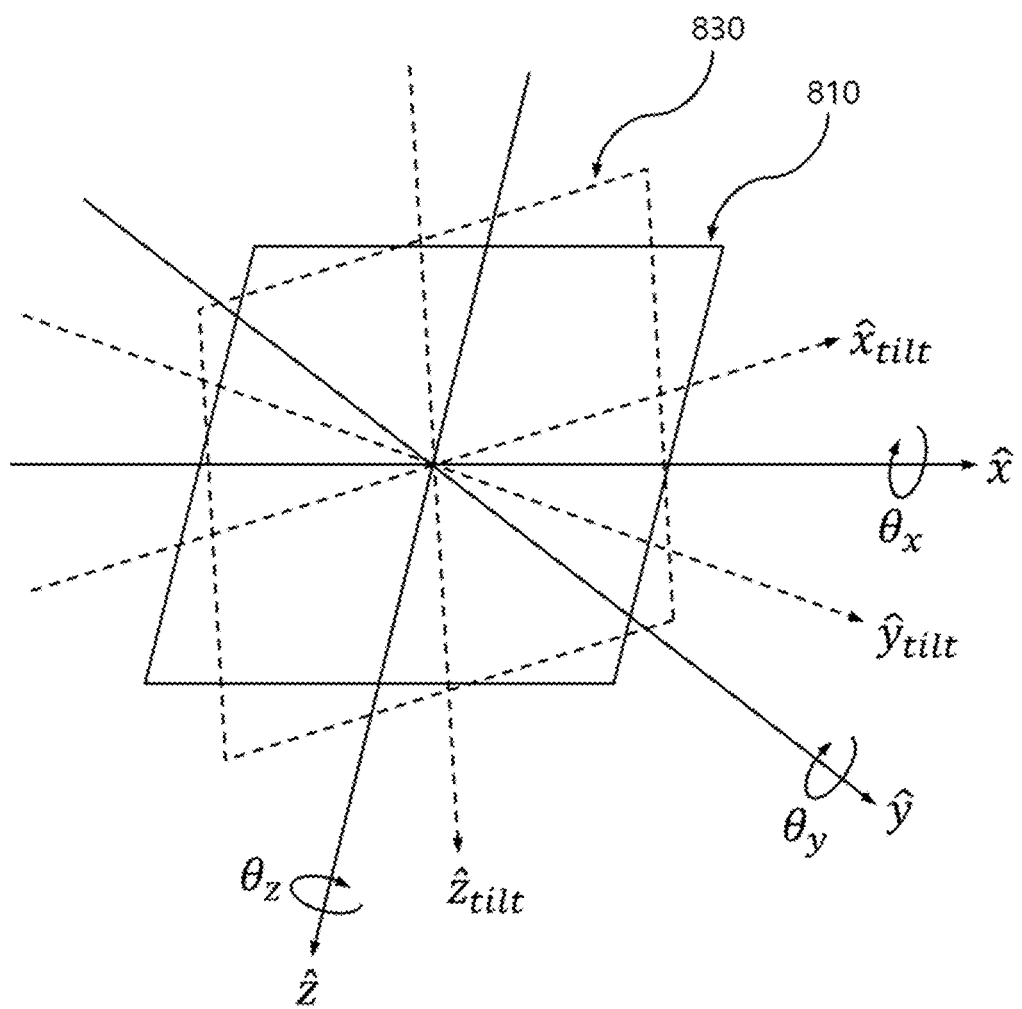
FIG. 8 is a diagram illustrating a reference coordinate system and a rotated coordinate system.
Figure 9:
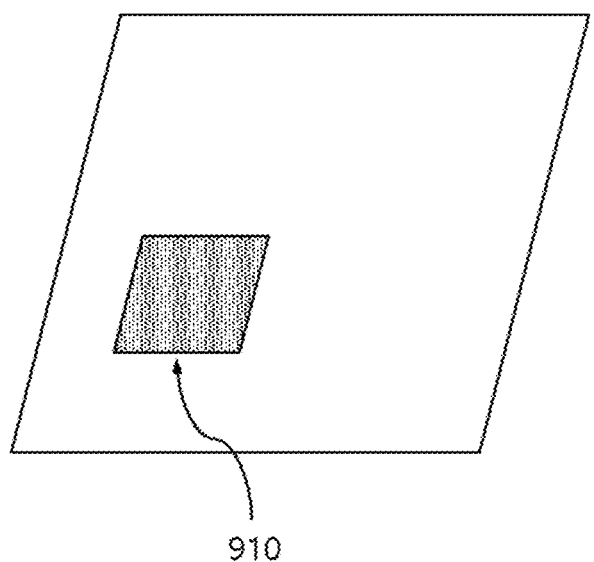
FIG. 9 is a diagram illustrating a hologram and a depth position measurement region.

Referring to FIG. 8, when a coordinate system is converted into a coordinate system rotated by $\theta_x$, $\theta_y$, and $\theta_z$ from the x-axis, y-axis, and z-axis of a reference coordinate system, respectively, the position in the rotated coordinate system is $\vec{r}_{tilt} = \overline{\overline{T}} \vec{r}$. In this case, $\overline{\overline{T}}$ is a transform matrix given from the following equation 11 and $\vec{r}_{tilt} = (x_{tilt}, y_{tilt}, z_{tilt})$ is a position vector of the rotated coordinate system.

$$\overline{\overline{T}} = \begin{bmatrix} a_1 & a_4 & a_7 \\ a_2 & a_5 & a_8 \\ a_3 & a_6 & a_9 \end{bmatrix} = \overline{\overline{R}}_z(\theta_z)\overline{\overline{R}}_y(\theta_y)\overline{\overline{R}}_x(\theta_x) \text{ where}$$ [Equation 11]

$$\overline{\overline{R}}_x(\theta_x) = \begin{bmatrix} 1 & 0 & 0 \\ 0 & \cos\theta_x & \sin\theta_x \\ 0 & -\sin\theta_x & \cos\theta_x \end{bmatrix},$$

$$\overline{\overline{R}}_y(\theta_y) = \begin{bmatrix} \cos\theta_y & 0 & -\sin\theta_y \\ 0 & 1 & 0 \\ \sin\theta_y & 0 & \cos\theta_y \end{bmatrix},$$

$$\overline{\overline{R}}_z(\theta_z) = \begin{bmatrix} \cos\theta_z & \sin\theta_z & 0 \\ -\sin\theta_z & \cos\theta_z & 0 \\ 0 & 0 & 1 \end{bmatrix}$$

are rotation matrixes, and $\theta_x$, $\theta_y$, and $\theta_z$ are rotation angles from the x-axis, y-axis, and z-axis, respectively, as shown in FIG. 8.

When the specific region 910 of the hologram of FIG. 9 is $i_{Hp}^l(x,y,z)$ in a reference coordinate system, $l=\{1,2,3,4,5\}$, which are the holograms of equations 1 to 5. A hologram guided in the depth direction of a rotated coordinate system obtained by transforming a hologram of a specific region in a reference coordinate system into the rotated coordinate system through angular spectrum rotational transformation is given as the following equation 12.

$$i_{Hp}^l(x_{tilt}, y_{tilt}, z_{tilt}) = \iint \begin{array}{l} I_{Hp}^l(u,v)|_{u=a_1 u_{tilt}+a_2 v_{tilt}+a_3 w_{tilt}(u_{tilt},v_{tilt})} \times \\ \phantom{I_{Hp}^l(u,v)|} v=a_2 u_{tilt}+a_5 v_{tilt}+a_6 w_{tilt}(\hat{u},\hat{v}) \\ \exp[j2\pi(u_{tilt} x_{tilt} + v_{tilt} y_{tilt} + w_{tilt}(u_{tilt},v_{tilt})z_{tilt})]|J(u_{tilt},v_{tilt})| \end{array} du_{tilt} dv_{tilt}$$

$$= \mathcal{F}^{-1}_{u_{tilt} \to x_{tilt}, v_{tilt} \to y_{tilt}} \begin{bmatrix} I_{Hp}^l(u,v)|_{u=a_1 u_{tilt}+a_2 v_{tilt}+a_3 w_{tilt}(u_{tilt},v_{tilt})} \times \\ \phantom{I_{Hp}^l(u,v)|} v=a_4 u_{tilt}+a_5 v_{tilt}+a_6 w_{tilt}(u_{tilt},v_{tilt}) \\ \exp[j2\pi w_{tilt}(u_{tilt},v_{tilt})z_{tilt}]|J(u_{tilt},v_{tilt})| \end{bmatrix}$$ [Equation 12]

where $\mathfrak{S}^{-1}_{u_{tilt} \to x_{tilt}, v_{tilt} \to y_{tilt}}[\ ]$ is 2D Fourier transform from a rotated spatial frequency axis to a rotated spatial axis, $I_{Hp}^l(u,v) = \mathfrak{S}_{x \to u, y \to v}[i_{Hp}^l(x,y)]$ is 2D Fourier transform of $i_{Hp}^l(x,y)$, $(u, v)$ is a spatial frequency axis in the $(x, y)$-axial directions, $a_m; m=\{1,2,3,4,5,6\}$ are elements of a transform matrix $\overline{\overline{T}}$ in equation 11, $(u_{tilt}, v_{tilt})$ are frequency axes in the $(x_{tilt}, y_{tilt})$-axial directions, respectively, $w_{tilt}(u_{tilt}, v_{tilt}) = (\lambda^{-2} - u_{tilt}^2 - v_{tilt}^2)^{1/2}$ is a spatial frequency axis in the $z_{tilt}$ direction, and $$J(u_{tilt}, v_{tilt}) = \frac{(a_2 a_6 - a_3 a_5)u_{tilt}}{w_{tilt}(u_{tilt}, v_{tilt})} + \frac{(a_3 a_4 - a_1 a_6)v_{tilt}}{w_{tilt}(u_{tilt}, v_{tilt})} + (a_1 a_5 - a_2 a_4)$$

is Jacobian showing the proportion amount of integral area element according to coordinate system conversion, that is, $dudv = |(u_{tilt}, v_{tilt})| du_{tilt} dv_{tilt}$.

When an image restored at $z_{tilt}$ in the depth direction on a rotated axis according to equation 12 is obtained, a hologram may be obtained in a rotated coordinate system through a method of resampling $I_H^l(u,v)$ with regular intervals by applying interpolation to $(u_{tilt}, v_{tilt})$ axes that are new variables and then applying fast Fourier transform or may be obtained by performing non-uniform discrete Fourier transform such as non-uniform discrete Fourier transform or non-uniform Fast Fourier transform on non-equispaced data.

For example, a hologram was guided through transformation using angular spectrum rotational transformation, but it is possible to transform and guide a hologram to a rotated coordinate system using various transformation methods.

The guided pattern of the specific region 910 of the hologram of FIG. 9 in a coordinate system rotated by $\theta_x$ and $\theta_y$ from the x-axis and the y-axis can be obtained from equation 12. Accordingly, the hologram of the specific region 910 is guided by equation 12 for a rotation region in which an objective plate can be rotated, that is, $\Theta_x^{Min} \leq \theta_x \leq \Theta_x^{Max}$, $\Theta_y^{Min} \leq \theta_y \leq \Theta_y^{Max}$, and a region at a possible depth position, that is, $z_{tilt}^{Min} \leq z_{tilt} \leq z_{tilt}^{Max}$, thereby finding out a rotation angle and a depth position at which the focus metric of the guided hologram of the specific region 910 has a maximum value, where $(\Theta_x^{Min} \leq \theta_x \leq \Theta_x^{Max}, \Theta_y^{Min} \leq \theta_y \leq \Theta_y^{Max})$ are a minimum value and a maximum value of a rotation angle region in which the objective plate can be rotated, and $(z_{tilt}^{Min}, z_{tilt}^{Max})$ are a minimum value and a maximum value of a depth position at which the objective plate can be positioned in a rotated coordinate system. There are various well-known searching methods as a searching method for finding out a rotation angle and a depth position in a rotated coordinate system at which a focus metric has a maximum value, but gradient descent is used in this embodiment. In this case, a focus metric function may be used as a target function of the gradient descent. A Tamura coefficient that is a representative focus metric is exemplified. A target function for finding out a rotation angle and a depth position using gradient descent is as the following equation 121.

$$f(\vec{p}) = -\sqrt{\frac{\sigma(x_{tilt}, x_{tilt}; \vec{p})}{\langle i_{Hp}^l(x_{tilt}, y_{tilt}; \vec{p}) \rangle}} \ ; \ l = \{1, 2, 3, 4, 5\}$$ [Equation 121]

where $\hat{p} = (\theta_x, \theta_y, \theta_z, z_{tilt})$ shows a rotation angle of a rotated coordinate system and a length guided in the depth direction of the rotated coordinate system, and $\langle i_{Hp}^l(x_{tilt}, y_{tilt}; \vec{p}) \rangle$ is an image guided by $z_{tilt}$ in the depth direction of the coordinate system rotated in accordance with equation 12 from a rotated coordinate system having rotation angles of $\theta_x$, $\theta_y$, and $\theta_z$, that is, the average of $i_{Hp}{}^l(x_{tilt}, y_{tilt}; \vec{p})$, and $\sigma(x_{tilt}, y_{tilt}; \vec{p})$ is a standard deviation. A focused image is restored at a corresponding position of a domain of function at which a target function becomes a minimum value, so the rotation angle and the depth position of the rotated coordinate system are obtained at a point corresponding to the minimum value of the target function of the domain of function of the target function, that is, $\vec{p}$ following $$\min_{\vec{p} \in R^4} f(\vec{p})$$

is obtained through gradient descent. First, the initial value $\vec{p}_0$ is estimated and then convergent $\vec{p}$ is found out in accordance with iteration of equation 122.

$$\vec{p}_{k+1} = \vec{p}_k - \alpha_k \nabla f(\vec{p}_k); k = \{0,1,2,3,\ldots\} \quad \text{[Equation 122]}$$

where $\nabla$ is a gradient operator, and $\alpha_k$ is a step size according to iteration and can be determined by various methods including Cauchy method, Barzilai and Borwein method, and Dai and Yuan method. For example, a step size according to Barzilai and Borwein method is $$\alpha_k = \frac{\left|(\vec{p}_k - \vec{p}_{k-1})^T [\nabla f(\vec{p}_k) - \nabla f(\vec{p}_{k-1})]\right|}{\|\nabla f(\vec{p}_k) - \nabla f(\vec{p}_{k-1})\|^2}.$$

In an embodiment, the depth position/rotation angle extractor 230 can calculate the position of monitoring-light reflected by the surface of an object or an objective plate as a vector.

The following equation 23 is obtained by inserting and arranging equation 21 and the position vector showing the reflected position of the monitoring-light on the inspection object or the objective plate.

$$\vec{r}_{det\_plane}^{\,i} = l_d^i \vec{d}_1 + \vec{r}_{mor\_si} + \frac{(l_d^i \vec{d}_i + \vec{r}_{mor\_si}) \circ \vec{n}_{det\_plane}}{\vec{d}_i \circ \vec{n}_{det\_plane}} [\vec{d}_i + 2(\vec{d}_i \circ \hat{z}_{tilt}) \hat{z}_{tilt}]; \quad \text{[Equation 23]}$$

$$i = \{1, 2\}$$

where the start position vector $\vec{r}_{mor\_st}^{\,i}$ of the monitoring-light, the projection direction vector $\vec{d}_i$ of first and second rays of monitoring-light, and a detection plane normal vector $\vec{n}_{det\_plane}$ are known parameters that are determined in accordance with the geometric structures of the monitoring-light generation module and the light position detection module, and the position $\vec{r}_{det\_plane}^{\,i}$ of the monitoring-light detected on the light detection surface of the light detection module is a position detected by rotation of an inspection object of an objective plate. Accordingly, the position of monitoring-light detected on the detection surface and a normal vector $\hat{z}_{tilt}$ of a rotated inspection object or objective surface in a reference coordinate system are $\vec{r}_{det\_plane}^{\,i} = (x_{det\_plane}^i, y_{det\_plane}^i, z_{det\_plane}^i); i = \{1,2\}$ and $\hat{z}_{tilt} = (x_{\hat{z}\_tilt}, y_{\hat{z}\_tilt}, z_{\hat{z}\_tilt})$. Equation 23 is expressed as a matrix composed of known parameters determined in accordance with a normal vector, the distance to an inspection object or an objective plate in the projection direction of first and second rays of monitoring-light, and the geometric structures of the monitoring-light generation module and the light position detection module that are variables, whereby it is given as the following equation 24.

$$\bar{\bar{M}} \begin{bmatrix} x_{\hat{z}\_tilt} \\ y_{\hat{z}\_tilt} \\ z_{\hat{z}\_tilt} \\ l_d^1 \\ l_d^2 \end{bmatrix} = \begin{bmatrix} x_{det\_plane}^1 \\ y_{det\_plane}^1 \\ z_{det\_plane}^1 \\ x_{det\_plane}^2 \\ y_{det\_plane}^2 \\ z_{det\_plane}^2 \end{bmatrix} \quad \text{[Equation 24]}$$

The variables $(x_{\hat{z}\_tilt}, y_{\hat{z}\_tilt}, z_{\hat{z}\_tilt}, l_d^1, l_d^2)$ are obtained by solving the simultaneous equation of equation 24 through various methods known in linear algebra. One of simplest methods is to solve the simultaneous equation by transforming the simultaneous equation into a reduced row echelon form through Gaussian Jordan elimination. Further, it is also possible to solve the simultaneous equation by forming a linear simultaneous equation system by selecting 5 of 6 rows of the simultaneous equation of equation 24, and then by multiplying both members by an inverse matrix. Further, considering that there is an error in measuring, the transform matrix $\bar{\bar{M}}$ is an overdetermined system in which the number of rows is larger than the number of columns. This can be estimated using various kinds of estimators based on regression analysis, etc. As a very simple method, it is possible to obtain the following equation 241 using an ordinary least square estimator.

$$\begin{bmatrix} x_{\hat{z}\_tilt} \\ y_{\hat{z}\_tilt} \\ z_{\hat{z}\_tilt} \\ l_d^1 \\ l_d^2 \end{bmatrix} = \left(\bar{\bar{M}}^T \bar{\bar{M}}\right)^{-1} \bar{\bar{M}}^T \begin{bmatrix} x_{det\_plane}^1 \\ y_{det\_plane}^1 \\ z_{det\_plane}^1 \\ x_{det\_plane}^2 \\ y_{det\_plane}^2 \\ z_{det\_plane}^2 \end{bmatrix} \quad \text{[Equation 241]}$$

where T means transposition of a matrix and −1 means inverse of a matrix. Although an ordinary least square estimator was proposed as an estimator, the solution can be obtained through various estimator methods known in the art such as weighted least square, generalized least square, Iteratively reweighted least squares, instrumental variables regression, and total least square.

In an embodiment, the monitoring-light generation module can generate one ray of light as monitoring-light and the light position detection module may be composed of an array of image elements including CCD and CMOS. The monitoring-light generator (monitoring-light generation module) generates and sends two rays of monitoring-light to an inspection object or an objective plate in FIG. 10, but when one ray of monitoring-light is generated by the monitoring-light generator in FIG. 10, one ray of monitoring-light (referred to as single monitoring-light) can travel to the light position detection unit (light position detection module) after being reflected by the inspection object or the objective plate. In particular, the light position detection unit can provide the position of light traveling to an imaging element such as CCD as output. When the monitoring-light generation module configured to generate one ray of monitoring-light generates one beam and the light position detection unit detects the position of the one beam, the following equation 242 is obtained by inserting and arranging equation 21 and the position vector showing the reflected position of the single monitoring-light on the inspection object or the objective plate.

$$\vec{r}^1_{det\_plane} = l^1_d \vec{d}_1 + \vec{r}^1_{mor\_si} + \frac{(l^1_d \vec{d}_1 + \vec{r}^1_{mor\_si}) \circ \vec{n}_{det\_plane}}{\vec{d}_1 \circ \vec{n}_{det\_plane}} [\vec{d}_1 + 2(\vec{d}_1 \circ \hat{z}_{tilt})\hat{z}_{tilt}]$$ [Equation 242]

where $\vec{d}_1$ is a projection direction vector of the single monitoring-light and is the distance to the inspection object or the objective plate in the projection direction of the single monitoring-light.

Equation 242 is expressed as a matrix composed of known parameters determined in accordance with a normal vector, the distance to an inspection object or an objective plate in the projection direction of the single monitoring-light, and the geometric structures of the monitoring-light generation module and the light position detection module that are variables, whereby it is given as the following equation 243.

$$\overline{M} \begin{bmatrix} x_{\hat{z}\_tilt} \\ y_{\hat{z}\_tilt} \\ z_{\hat{z}\_tilt} \\ l^1_d \end{bmatrix} = \begin{bmatrix} x^1_{det\_plane} \\ y^1_{det\_plane} \\ z^1_{det\_plane} \end{bmatrix}$$ [Equation 243]

The transform matrix $\overline{M}$ is an underdetermined system in which the number of rows is smaller than the number of columns. This can be estimated using various kinds of estimators based on regression analysis, etc.

The rotated coordinate system generator 240 can generate a rotated coordinate system corresponding to an objective surface using a depth position and a rotation angle.

In an embodiment, the rotated coordinate system generator 240 can generate a rotated coordinate system through the following first method. A plane equation of a rotated plan crossing depth positions $(x_1,y_1,z_1)$, $(x_2,y_2,z_2)$, and $(x_3,y_3,z_3)$ of first, second, and third cell regions is given as the following equation 13.

$$\vec{n} \cdot \vec{r} - 1 = 0$$ [Equation 13]

where $\vec{r} = (x,y,z)$ is a position vector in a non-rotated reference coordinate system, · an inner product operator, and $\vec{n} = (n_x, n_y, n_z)$ is a normal vector of a plan crossing the first, second, and third cell regions, which is given as the following equation 14.

$$\vec{n} = A^{-1} \begin{bmatrix} 1 \\ 1 \\ 1 \end{bmatrix}$$ [Equation 14]

where $A^{-1}$ is an inverse matrix of a matrix $$A = \begin{bmatrix} x_1 & y_1 & z_1 \\ x_2 & y_2 & z_2 \\ x_3 & y_3 & z_3 \end{bmatrix}$$

having the positions of the first, second, and third cell regions as rows.

When a perpendicular coordinate system in which an axis perpendicular to a rotated plane is defined as the depth direction of the rotated plane is formed, a unit direction vector in the depth direction is given as a regulated normal vector of the rotated plane as the following equation 15.

$$\hat{z}_{tilt} = \frac{\vec{n}}{|\vec{n}|}$$ [Equation 15]

A unit vector in a direction that is parallel with a rotated plane is a unit vector having two points, which satisfy the plane equation of equation 13 as a start point and an end point, and is given as the following equation 16.

$$\hat{x}_{tilt} = \frac{\vec{r}_1 - \vec{r}_2}{|\vec{r}_1 - \vec{r}_2|}$$ [Equation 16]

where $\vec{r}_1, \vec{r}_2$, which are two certain positions on a rotated plane, are two position vectors that satisfy equation 13. The other unit position vectors of the rotated plane are vector products of the unit position vector in the depth direction and a unit direction vector in a direction parallel with the plane, and are given as the following equation 17.

$$\hat{y}_{tilt} = \hat{z}_{tilt} \times \hat{x}_{tilt} = \frac{\vec{n}}{|\vec{n}|} \times \frac{\vec{r}_1 - \vec{r}_2}{|\vec{r}_1 - \vec{r}_2|}$$ [Equation 17]

A rotated coordinate system having a unit direction vector rotated from the origin of a non-rotated reference coordinate system is defined as in FIG. 8. In FIG. 8, $\hat{x}_{tilt}, \hat{y}_{tilt}, \hat{z}_{tilt}$ are unit direction vectors in a rotated plane coordinate system and $\hat{x}, \hat{y}, \hat{z}$ are unit direction vectors in a non-rotated reference coordinate system. The position of a reference coordinate system is given as the following equation 18 in a rotated coordinate system in accordance with equations 15 to 17.

$$(x_{tilt}, y_{tilt}, z_{tilt}) = (\hat{x}_{tilt} \circ \vec{r}, \hat{y}_{tilt} \circ \vec{r}, \hat{z}_{tilt} \circ \vec{r}) = \overline{\overline{T}} \vec{r}$$ [Equation 18]

where $\overline{\overline{T}} = \begin{bmatrix} a_1 & a_4 & a_7 \\ a_2 & a_5 & a_8 \\ a_3 & a_6 & a_9 \end{bmatrix} = \begin{bmatrix} \frac{\vec{r}_1 - \vec{r}_2}{|\vec{r}_1 - \vec{r}_2|} \\ \frac{\vec{n}}{|\vec{n}|} \times \frac{\vec{r}_1 - \vec{r}_2}{|\vec{r}_1 - \vec{r}_2|} \\ \frac{\vec{n}}{|\vec{n}|} \end{bmatrix}$ is a transform matrix.

Since the position of the centers of first, second, and third cell regions are $(x_1,y_1,z_1)$, $(x_2,y_2,z_2)$, and $(x_3,y_3,z_3)$, and a reference coordinate system and a rotated coordinate system share an origin, the depth position of an object plane rotated from the horizontal origin ((x,y)=(0,0)) is given as the following equation 181 through the equation of a straight line crossing two points in 3D space.

$$z = \frac{(z_m - z_n)x_n}{x_n - x_m} + z_n; n \neq m, n = \{1, 2, 3\}, m = \{1, 2, 3\} \quad \text{[Equation 181]}$$

$$z = \frac{(z_m - z_n)y_n}{y_n - y_m} + z_n; n \neq m, n = \{1, 2, 3\}, m = \{1, 2, 3\}$$

where $(x_n, y_n, z_n); n = \{1,2,3\}$ and $(x_m, y_m, z_m); m = \{1,2,3\}$ are the positions of the center of first, second, and third cell regions.

In an embodiment, the rotated coordinate system generator 240 can generate a rotated coordinate system through the following second method. The rotated coordinate system generator 240 can obtain the transform matrix of equation 11 by applying input corresponding to a trained CNN model and by obtaining the rotation angle of a rotated plane as output. In this case, the CNN is trained using a rotation angle as the output of the CNN to achieve the object of training efficiency of the CNN, but it is also possible to obtain a transform matrix by training the CNN using the elements of a transform matrix as output. Further, it is possible to find out a depth position at a certain position of an objective surface when extracting the rotation angle of a rotated plane using a CNN.

In another embodiment, the rotated coordinate system generator 240 trains a CNN using rotation angles $\theta_x$, $\theta_y$, and $\theta_z$ of the rotated plane 830 of FIG. 8 and the depth position at the origin as output, and obtains the rotation angle that is the output of the CNN and the depth position at the origin as the output of a trained CNN model, thereby being able to a transform matrix and a depth position according to equation 11 of the rotated plane 830.

In an embodiment, the rotated coordinate system generator 240 can generate a rotated coordinate system through the following third method. The plane equation of a rotated plane formed by an inspection object or an objective plate rotated using $(x_{\hat{z}\_tilt}, y_{\hat{z}\_tilt}, z_{\hat{z}\_tilt}, l_d^1, l_d^2)$ obtained by solving the simultaneously equation of equation 24 is given as the following equation 25.

$$\vec{z}_{tilt} \cdot (\vec{r} - \vec{r}_{obj\_plane}^i) = 0; i = \{1,2\} \quad \text{[Equation 25]}$$

where $\hat{z}_{tilt}$ is a normal vector of a rotated plane, that is, $\hat{z}_{tilt} = x_{\hat{z}\_tilt}\hat{x} + y_{\hat{z}\_tilt}\hat{y} + z_{\hat{z}\_tilt}\hat{z}$, and $\vec{r}_{obj\_plane}^i$ is a position vector showing the position of reflected monitoring-light on an inspection object or an objective plane, that is, $\vec{r}_{obj\_plane}^i = l_d^i \vec{d}_i + \vec{r}_{mor\_st}^i; i = \{1,2\}$.

A unit vector in a direction that is parallel with a rotated plane is a unit vector having two points, which satisfy the plane equation of equation 25 as a start point and an end point, and is given as the following equation 26.

$$\hat{x}_{tilt} = \frac{\vec{r}_1 - \vec{r}_2}{|\vec{r}_1 - \vec{r}_2|} \quad \text{[Equation 26]}$$

where $\vec{r}_1, \vec{r}_2$, which are certain points on a rotated plane, are two position vectors satisfying equation 25. The other unit position vectors of the rotated plane are vector products of the unit position vector in the depth direction and a unit direction vector in a direction parallel with the plane, and are given as the following equation 27.

$$\hat{y}_{tilt} = \hat{z}_{tilt} \times \hat{x}_{tilt} = \frac{\vec{n}}{|\vec{n}|} \times \frac{\vec{r}_1 - \vec{r}_2}{|\vec{r}_1 - \vec{r}_2|} \quad \text{[Equation 27]}$$

A rotated coordinate system having a unit direction vector rotated from the original point of a non-rotated reference coordinate system is defined as in FIG. 7. In FIG. 7, $\hat{x}_{tilt}, \hat{y}_{tilt}, \hat{z}_{tilt}$ are unit direction vectors in a rotated plane coordinate system and $\hat{x}, \hat{y}, \hat{z}$ are unit direction vectors in a non-rotated reference coordinate system. The position of a reference coordinate system is given as the following equation 28 in a rotated coordinate system in accordance with equations 25 to 27.

$$(x_{tilt}, y_{tilt}, z_{tilt}) = (\hat{x}_{tilt} \circ \vec{r}, \hat{y}_{tilt} \circ \vec{r}, \hat{z}_{tilt} \circ \vec{r}) = \bar{\bar{T}} \vec{r} \quad \text{[Equation 28]}$$

$$\text{where } \bar{\bar{T}} = \begin{bmatrix} a_1 & a_4 & a_7 \\ a_2 & a_5 & a_8 \\ a_3 & a_6 & a_9 \end{bmatrix} = \begin{bmatrix} \frac{\vec{r}_1 - \vec{r}_2}{|\vec{r}_1 - \vec{r}_2|} \\ \frac{\vec{n}}{|\vec{n}|} \times \frac{\vec{r}_1 - \vec{r}_2}{|\vec{r}_1 - \vec{r}_2|} \\ \frac{\vec{n}}{|\vec{n}|} \end{bmatrix}$$

is a transform matrix.

The hologram restorer 250 can obtain an image of an object by restoring a hologram in a plane formed in the depth direction of a rotated coordinate system.

In an embodiment, the hologram restorer 250 restores an image by transforming a hologram obtained in a coordinate system $(x,y,z)$, that is, $i_{Hp}^i(x,y,z); l=\{1,2,3,4,5\}$ using angular spectrum rotational transformation, and guiding the hologram in the depth direction of a rotated coordinate system $(\hat{x}, \hat{y}, \hat{z})$. The restored image is given as the following equation 19.

$$\hat{i}_H^l(\hat{x}, \hat{y}, \hat{z}) = \quad \text{[Equation 19]}$$

$$\int\int I_H^l(u, v)\Big|_{\substack{u=a_1\hat{u}+a_2\hat{v}+a_3\hat{w}(\hat{u},\hat{v}) \\ v=a_4\hat{u}+a_5\hat{v}+a_6\hat{w}(\hat{u},\hat{v})}} \exp[j2\pi(\hat{u}\hat{x} + \hat{v}\hat{y} + \hat{w}(\hat{u},\hat{v})\hat{z})]|J(\hat{u}, \hat{v})|d\hat{u}d\hat{v} =$$

$$\mathcal{F}^{-1}_{\hat{u}\to\hat{x},\hat{v}\to\hat{y}}\left[I_H^l(u, v)\Big|_{\substack{u=a_1\hat{u}+a_2\hat{v}+a_3\hat{w}(\hat{u},\hat{v}) \\ v=a_4\hat{u}+a_5\hat{v}+a_6\hat{w}(\hat{u},\hat{v})}} \exp[j2\pi\hat{w}(\hat{u},\hat{v})\hat{z}]|J(\hat{u}, \hat{v})|\right]$$

where $\mathfrak{F}_{\hat{u}\to\hat{x},\hat{v}\to\hat{y}}[\ ]$ is 2D Fourier transform from a rotated spatial frequency axis to a rotated frequency axis, $I_H^l(u,v)=\mathfrak{F}_{x\to u,y\to v}[i_H^l(x,y)]$ is 2D Fourier transform of $i_H^l(x,y)$, (u, v) is a spatial frequency axis in the (x, y)-axial directions, $a_m; m=\{1,2,3,4,5,6\}$ are elements of a transform matrix T in equation 13, $(\hat{u},\hat{v})$ are frequency axes in the $(\hat{x},\hat{y})$-axial directions, respectively, $\hat{w}(\hat{u},\hat{v})=(\lambda^{-2}-\hat{u}^2-\hat{v}^2)^{1/2}$ is a spatial frequency axis in the $\hat{z}$ direction, and $$J(\hat{u},\hat{v}) = \frac{(a_2 a_6 - a_3 a_5)\hat{u}}{\hat{w}(\hat{u},\hat{v})} + \frac{(a_3 a_4 - a_1 a_6)\hat{v}}{\hat{w}(\hat{u},\hat{v})} + (a_1 a_5 - a_2 a_4)$$

is Jacobian showing the proportion amount of integral area element according to coordinate system conversion, that is, $dudv=|J(\hat{u},\hat{v})|d\hat{u}d\hat{v}$.

When an image restored at $\hat{z}$ in the depth direction on a rotated axis according to equation 19 is obtained, a hologram may be obtained in a rotated coordinate system through a method of resampling $I_H^l(u,v)$ with regular intervals by applying interpolation to $(\hat{u},\hat{v})$ axes that are new variables and then applying fast Fourier transform or may be obtained by performing non-uniform discrete Fourier transform such as non-uniform discrete Fourier transform or non-uniform Fast Fourier transform on non-equispaced data.

In this embodiment, it is possible to obtain a 3D image of the object by transforming a hologram of a reference coordinate system into a rotated coordinate system and restoring the hologram in a plane formed in the depth direction in the rotated coordinate system.

For example, a hologram was guided through conversion using angular spectrum rotational transformation, but it is possible to transform and guide a hologram to a rotated coordinate system using various conversion methods.

In an embodiment, the hologram restorer 250 can obtain an image of an object by restoring a hologram at a depth position of a reference coordinate system and then guiding the hologram to a plane formed in the depth direction of a rotated coordinate system.

That is, the hologram restorer 250 can obtain a focused image regardless of rotation by restoring a hologram obtained in a reference coordinate system (x,y,z), that is, $i_H^l(x,y,z); l=\{1,2,3,4,5\}$ at a depth position of the reference coordinate system in accordance with equation 6 and then obtaining an image guided to a plane perpendicular to the depth direction of a rotated coordinate system. In this case, guiding may be achieved by various digital guiding methods including Rayleigh-Sommerfeld method. The following equation 191 shows an image restored in a rotated plane by guiding an image restored at a specific depth position of a reference coordinate system to a plane of a rotated coordinate system corresponding to the specific depth position, for example, using Rayleigh-Sommerfeld method.

where $\lambda$ is the wavelength of a laser used to record a hologram and $O_{rec}(x,y,z)$ is an image restored in accordance with equation 6.

In this embodiment, it is possible to obtain a 3D image of the object by transforming a hologram of a reference coordinate system into a rotated coordinate system and restoring the hologram in a plane formed in the depth direction in the rotated coordinate system.

In an embodiment, the hologram restorer 250 can restore a hologram in sequential planes that are formed in the depth direction of a reference coordinate system, and then can interpolate the holograms into a rotated coordinate system.

In an embodiment, the hologram restorer 250 generates a 3D matrix using the depth position of each of sequential planes as an axis for images restored in the sequential planes and interpolates the 3D matrix to the axes of a rotated coordinate system, thereby being able to obtain a 3D image of an object.

That is, the hologram restorer 250 can restore the hologram, that is, $i_H^l(x,y,z); l=\{1,2,3,4,5\}$ obtained from the reference coordinate system (x, y, z) in the reference coordinate system in accordance with equation 6 for sequential depth positions. The hologram restorer 250 can generate a 3D matrix using sequential depth positions as axes for images restored at the sequential depth positions and then can interpolate images restored at the sequential positions to the axes of a rotated coordinate system, which is given as the following equation 20.

$$O_{rec}^{tilt}(\vec{r}_{tilt}) = O_{rec}(\vec{r})|_{\vec{r}_{tilt}=\overline{M}\vec{r}} \qquad \text{[Equation 20]}$$

where $\overline{M}$ is a transform matrix for transformation from a reference coordinate system to a rotated coordinate system, $\vec{r}=(x, y, z)$ is a position vector of a reference coordinate system, and $\vec{r}_{tilt}=(x_{tilt}, y_{tilt}, z_{tilt})$ is a position vector of a rotated coordinate system.

The controller 260 can control the general operation of the automatic optical inspection apparatus 130 and can manage control flow or data flow among the hologram capturer 210, the light-monitoring processor 220, the depth position/rotation angle extractor 230, the rotated coordinate system generator 240, and the hologram restorer 250.

Figure 3:
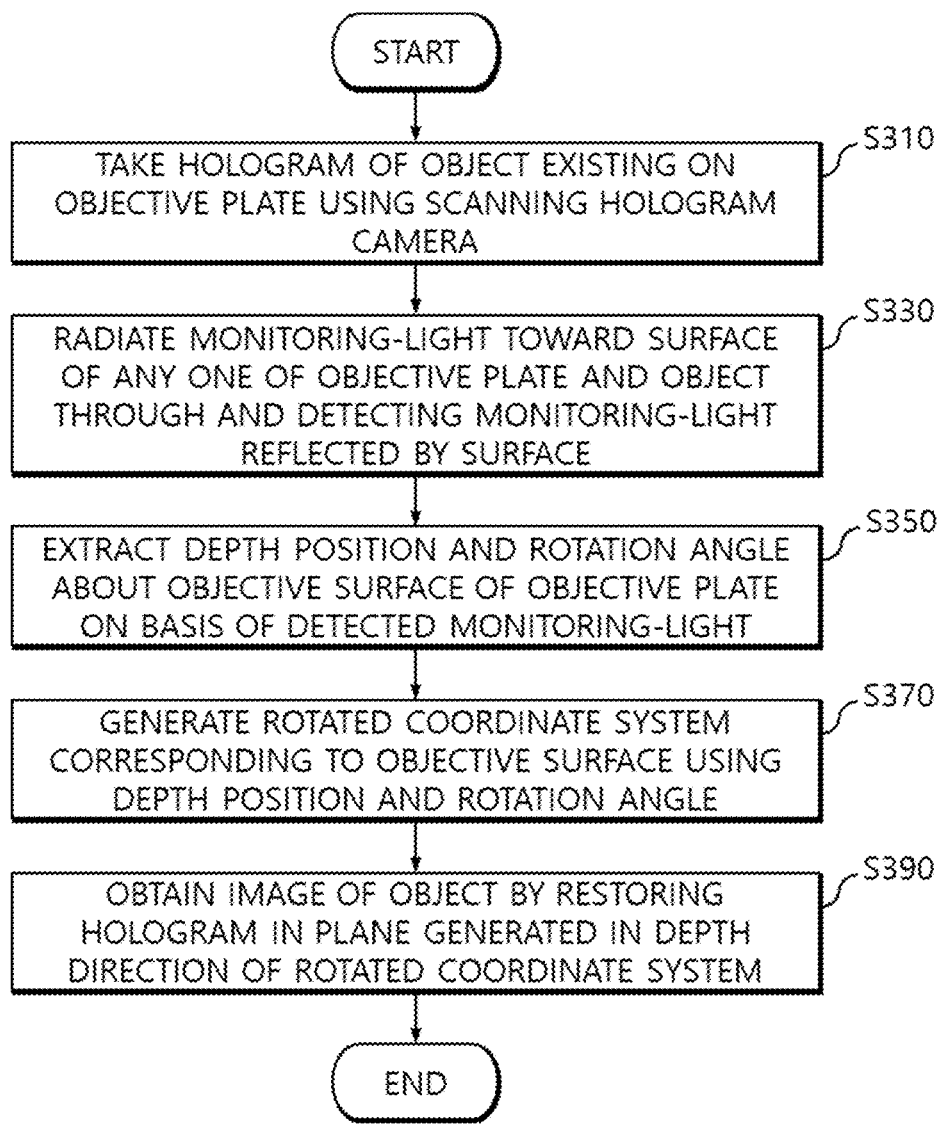
FIG. 3 is a flowchart illustrating an automatic optical inspection process using scanning holography that is performed in the automatic optical inspection apparatus shown in FIG. 1.

FIG. 3 is a flowchart illustrating an automatic optical inspection process using scanning holography that is performed in the automatic optical inspection apparatus shown in FIG. 1.

Referring to FIG. 3, the automatic optical inspection apparatus 130 can take a hologram of an object existing on an objective plate using the scanning hologram camera 110 through the hologram capturer 210 (step S310). The automatic optical inspection apparatus 130 can radiate monitoring-light toward the surface of any one of an objective plate and an object through the light-monitoring processor 220 and can detect monitoring-light reflected by the surface (step S330). The automatic optical inspection apparatus 130 can extract a depth position and a rotation angle about an objective surface of the objective plate on the basis of the monitoring-light detected through the depth position/rotation angle extractor 230 (step S350).

[Equation 191]

$$O_{rec}^{tilt}(x_{tilt}, y_{tilt}, z_{tilt}) = \frac{j}{\lambda}\int\int O_{rec}(x,y,z) \frac{\exp\left(-j\frac{2\pi}{\lambda}\sqrt{(x-x_{tilt})^2+(y-y_{tilt})^2+(z-z_{tilt})^2}\right)}{\sqrt{(x-x_{tilt})^2+(y-y_{tilt})^2+(z-z_{tilt})^2}} dxdy$$

Further, the automatic optical inspection apparatus 130 can generate a rotated coordinate system corresponding to the objective surface using the depth position and the rotation angle extracted by the depth position/rotation angle extractor 230 through the rotated coordinate system generator 240 (step S370). The automatic optical inspection apparatus 130 can obtain an image of the object by restoring a hologram in a plane formed in the depth direction of the rotated coordinate system through the hologram restorer 250 (step S390).

The automatic optical inspection apparatus 130 according to an embodiment of the present disclosure can calculate the depth position and the rotation angle of the objective surface by numerically processing a hologram through the depth position/rotation angle extractor 230. In this case, the numerical method may include an extraction method based on 3D region analysis (method A), an extraction method based on a CNN (method B), an extraction method based on gradient descent (method C), and an extraction method based on light monitoring (method D), and may extract a depth position and a rotation angle by partially combining the methods.

For example, for single monitoring-light in the method D, the depth position/rotation angle extractor 230 can only estimate a rotation angle through the underdetermined system in equation 243. However, when only a depth position is extracted by the method B or C or a depth position is obtained by analyzing a first region or first and second regions by the method A, the depth position/rotation angle extractor 230 can finally extract a rotation angle by calculating the distance $l_d^i$ to an inspection object or an objective plate in the projection direction of the single monitoring-light, using the depth position and the start position $\vec{d}_i$ of the single monitoring-light in accordance with a geometric structure.

In addition, the depth position/rotation angle extractor 230 can obtain a rotation angle or a depth position as partial output in the methods A to C and can generate a rotated coordinate system by extracting rotation angle and depth position information by combining rotation angle or depth position information obtained through the methods A to C.

Although the present disclosure was described above with reference to exemplary embodiments, it should be understood that the present disclosure may be changed and modified in various ways by those skilled in the art, without departing from the spirit and scope of the present disclosure described in claims.

DESCRIPTION OF THE REFERENCE CHARACTERS

100: system 100 for automatic optical inspection using scanning holography
110: scanning hologram camera
130: automatic optical inspection apparatus
150: data base
210: a hologram capturer
220: light-monitoring processor
230: depth position/rotation angle extractor
240: rotated coordinate system generator
250: hologram restorer
260: controller
610: first cell region
620: second cell region
630: third cell region
810: reference plane
830: rotated plane
910: specific region

What is claimed is:

1. An apparatus for automatic optical inspection using scanning holography, the apparatus comprising:
   a hologram capturer that takes a hologram of an object existing on an objective plate using a scanning hologram camera;
   a depth position/rotation angle extractor that extracts a depth position and a rotation angle about an objective surface of the objective plate on the basis of the hologram;
   a rotated coordinate system generator that generates a rotated coordinate system corresponding to the objective surface using the depth position and the rotation angle; and
   a hologram restorer that obtains an image of the object by restoring the hologram in a plane formed in a depth direction of the rotated coordinate system.

2. The apparatus of claim 1, further comprising a light-monitoring processor that controls a monitoring-light generator to radiate monitoring-light toward a surface of any one of the objective plate and the object and detects monitoring-light reflected by the surface,
   wherein the depth position/rotation angle extractor extracts a depth position and a rotation angle about the objective surface of the objective plate on the basis of the detected monitoring-light.

3. The apparatus of claim 1, wherein the scanning hologram camera includes a light source that generates an electromagnetic wave, a splitting unit that splits the electromagnetic wave, a scan unit that scans the object using interference beams generated by the split electromagnetic waves, and a light detection unit that detects a reflected, fluorescent, or transmitted beam from the object; and
   the hologram capturer generates a complex-number hologram as the result of taking a hologram.

4. The apparatus of claim 2, wherein the scanning hologram camera includes a light source that generates an electromagnetic wave, a splitting unit that splits the electromagnetic wave, a scan unit that scans the object using interference beams generated by the split electromagnetic waves, and a light detection unit that detects a reflected, fluorescent, or transmitted beam from the object; and
   the hologram capturer generates a complex-number hologram as the result of taking a hologram.

5. The apparatus of claim 1, wherein the depth position/rotation angle extractor extracts a depth position in each of three regions spaced apart from each other and independently defined on the objective surface, and then extracts a depth position and a rotation angle about the objective surface.

6. The apparatus of claim 2, wherein the depth position/rotation angle extractor extracts a depth position in each of three regions spaced apart from each other and independently defined on the objective surface, and then extracts a depth position and a rotation angle about the objective surface.

7. The apparatus of claim 5, wherein the depth position/rotation angle extractor performs: a first step of restoring the hologram at each of sequential depth positions;
   a second step of calculating a focus metric in each of the three regions for restored images; and
   a third step of determining a depth position at which the focus metric is a maximum value as a depth position of each of the three regions.

8. The apparatus of claim 6, wherein the depth position/rotation angle extractor performs: a first step of restoring the hologram at each of sequential depth positions;

a second step of calculating a focus metric in each of the three regions for restored images; and a third step of determining a depth position at which the focus metric is a maximum value as a depth position of each of the three regions.

9. The apparatus of claim 5, wherein the depth position/rotation angle extractor obtains a depth position in each of the three regions as output by inputting hologram data into a Convolutional Neural Network (CNN) model and then extracts a depth position and a rotation angle of the objective surface.

10. The apparatus of claim 6, wherein the depth position/rotation angle extractor obtains a depth position in each of the three regions as output by inputting hologram data into a Convolutional Neural Network (CNN) model and then extracts a depth position and a rotation angle of the objective surface.

11. The apparatus of claim 1, wherein the depth position/rotation angle extractor extracts a depth position and a rotation angle about the objective surface using a CNN model generated through training in which a specific region for forming the hologram is input and a rotation angle of a rotated objective surface as output.

12. The apparatus of claim 11, wherein the depth position/rotation angle extractor Fourier-transforms the hologram into a spatial frequency region and then uses a region corresponding to the specific region in the spatial frequency region as input.

13. The apparatus of claim 1, wherein the depth position/rotation angle extractor extracts a depth position and a rotation angle about the objective surface using gradient descent on the basis of a portion of or the entire region of the hologram.

14. The apparatus of claim 2, wherein the depth position/rotation angle extractor extracts a depth position and a rotation angle about the objective surface using gradient descent on the basis of a portion of or the entire region of the hologram.

15. The apparatus of claim 1, wherein the hologram restorer restores an image of the object by transforming the hologram into the rotated coordinate system and guiding the hologram in a depth direction of the rotated coordinate system.

16. The apparatus of claim 15, wherein the hologram restorer obtains an image of the object by transforming the hologram through angular spectrum rotational transformation and guiding the hologram in a depth direction of a rotated coordinate system.

17. The apparatus of claim 1, wherein the hologram restorer obtains an image of the object by restoring the hologram at a depth position of a reference coordinate system and then guiding the hologram to a plane formed in a depth direction of the rotated coordinate system, wherein the hologram restorer obtains a 3D image of the object by restoring the hologram at a depth position of a reference coordinate system and then guiding the hologram to sequential planes formed in the depth direction of the rotated coordinate system.

18. The apparatus of claim 2, wherein the hologram restorer obtains an image of the object by restoring the hologram at a depth position of a reference coordinate system and then guiding the hologram to a plane formed in a depth direction of the rotated coordinate system, wherein the hologram restorer obtains a 3D image of the object by restoring the hologram at a depth position of a reference coordinate system and then guiding the hologram to sequential planes formed in the depth direction of the rotated coordinate system.

19. The apparatus of claim 1, wherein the hologram restorer restores the hologram in each of sequential planes formed in a depth direction of a reference coordinate system and then interpolates the restored holograms to the rotated coordinate system, wherein the hologram restorer obtains an image of the object by generating a 3D matrix using a depth position of each of the sequential planes as an axis for images restored in the sequential planes and interpolating the 3D matrix to axes of the rotated coordinate system.

20. A method of automatic optical inspection using scanning holography, the method comprising:

taking a hologram of an object existing on an objective plate using a scanning hologram camera;

extracting a depth position and a rotation angle about an objective surface of the objective plate on the basis of the hologram;

generating a rotated coordinate system corresponding to the objective surface using the depth position and the rotation angle; and obtaining an image of the object by restoring the hologram in a plane formed in a depth direction of the rotated coordinate system.

* * * * *